US012781870B2

(12) United States Patent
Pathak et al.

(10) Patent No.: US 12,781,870 B2
(45) Date of Patent: Nov. 3, 2026

(54) SUBSEA VALVE ACTUATOR

(71) Applicant: ONESUBSEA IP UK LIMITED, London (GB)

(72) Inventors: Parth Pathak, Houston, TX (US); Samuvel Vellingiri, Houston, TX (US); Nghia T. Tran, Houston, TX (US); Loc Hoang, Houston, TX (US); Andrew Hench, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 240 days.

(21) Appl. No.: 18/708,044

(22) PCT Filed: Dec. 2, 2022

(86) PCT No.: PCT/US2022/051706
§ 371 (c)(1),
(2) Date: May 7, 2024

(87) PCT Pub. No.: WO2023/102219
PCT Pub. Date: Jun. 8, 2023

(65) Prior Publication Data

US 2026/0160341 A1 Jun. 11, 2026

Related U.S. Application Data

(60) Provisional application No. 63/384,453, filed on Nov. 21, 2022, provisional application No. 63/285,172, filed on Dec. 2, 2021.

(51) Int. Cl.
*F16K 31/04* (2006.01)
*F16D 15/00* (2006.01)
(Continued)

(52) U.S. Cl.
CPC ............ *F16K 31/048* (2013.01); *F16D 15/00* (2013.01); *F16D 41/067* (2013.01);
(Continued)

(58) Field of Classification Search
None
See application file for complete search history.

(56) References Cited

U.S. PATENT DOCUMENTS 3,258,985 A * 7/1966 Jordan .................. F16K 31/047 74/388 R
4,314,688 A 2/1982 Leman, Jr.
(Continued)

FOREIGN PATENT DOCUMENTS

JP 5354314 B2 11/2013
WO WO-02074619 A1 * 9/2002 ............. B64D 11/06
(Continued)

OTHER PUBLICATIONS

Search Report and Written Opinion of International Patent Application No. PCT/US2022/051706 Dated Apr. 7, 2023, 10 Pages.
(Continued)

*Primary Examiner* — Atif H Chaudry
(74) *Attorney, Agent, or Firm* — Kyle R. Miiller

(57) ABSTRACT

A system includes an actuator having an actuation stem, a screw assembly, an electric drive, and a lock. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem.

20 Claims, 11 Drawing Sheets

(51) Int. Cl.
*F16D 41/067* (2006.01)
*F16D 41/08* (2006.01)
*F16D 41/10* (2006.01)
*F16K 3/02* (2006.01)
*F16K 31/50* (2006.01)

(52) U.S. Cl.
CPC ......... *F16D 41/088* (2013.01); *F16D 41/105* (2013.01); *F16K 3/0254* (2013.01); *F16K 31/04* (2013.01); *F16K 31/043* (2013.01); *F16K 31/045* (2013.01); *F16K 31/047* (2013.01); *F16K 31/508* (2013.01)

(56) References Cited

U.S. PATENT DOCUMENTS

| | | | | |
|---|---|---|---|---|
| 12,140,247 | B2 | 11/2024 | Pathak | |
| 2014/0033842 | A1* | 2/2014 | Morin | F16H 19/04<br>74/89.17 |
| 2015/0369001 | A1 | 12/2015 | Hoang | |
| 2025/0067360 | A1 | 2/2025 | Pathak | |

FOREIGN PATENT DOCUMENTS

| | | | |
|---|---|---|---|
| WO | 2018158251 | A1 | 9/2018 |
| WO | 2019141595 | A1 | 7/2019 |

OTHER PUBLICATIONS

International Preliminary Report on Patentability of International Patent Application No. PCT/US2022/051706 Dated Jun. 13, 2024, 7 Pages.

* cited by examiner

SUBSEA VALVE ACTUATOR

CROSS REFERENCE TO RELATED APPLICATIONS

This application is a National Stage Entry of International Application No. PCT/US2022/051706, filed Dec. 2, 2022, which claims priority from and the benefit of U.S. Provisional Application Ser. No. 63/285,172, entitled "Electric Actuator Mechanisms for Subsea Valves," filed Dec. 2, 2021, and U.S. Provisional Application Ser. No. 63/384,453, entitled "Offset Motor Mechanism for All Electric Subsea Valve Actuator," filed Nov. 21, 2022, each of which is hereby incorporated by reference in its entirety.

BACKGROUND

The present disclosure relates generally to an actuator for a valve, such as a gate valve.

For subsea applications, hydrocarbon fluids such as oil and natural gas are obtained from a subterranean geologic formation, referred to as a reservoir, by drilling a well through a subsea wellhead system that penetrates the hydrocarbon-bearing geologic formation.

In subsea applications, various types of infrastructure may be positioned along a sea floor and coupled by electrical lines. There is a tendency to equip subsea trees with actuators. Traditionally, most of the subsea production systems use hydraulic fluids for operating the subsea valves on subsea trees. Known actuators rely on a spring to automatically close the valve. If a mechanical override is required, the override is achieved with tools that provide a mechanical push to open the valves. Unfortunately, when the spring system is utilized, the push force required to open the valve is increased because of the need to compress the spring.

It would thus be helpful to provide an actuator enabling closure and/or opening of a valve through a battery system or a manual tool and eliminating the spring return system, which is used in known actuators. When the spring is removed, the force from the override mechanism is only required to overcome the actual valve opening, which can be further tuned to provide reduced power at various stages of the valve opening.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In embodiments of the disclosure, a system includes an actuator having a screw assembly coupled to an actuation stem. The screw assembly includes a rotating screw portion coupled to a translating screw portion. The actuator further includes a self-lock clutch coupled to the screw assembly. The self-lock clutch includes a locked position that blocks rotation of the rotating screw portion and an unlocked position that enables rotation of the rotating screw portion. The actuator also includes a drive section coupled to the self-lock clutch. The self-lock clutch may move from the locked position to the unlocked position when a torque is applied by the drive section to the self-lock clutch.

In embodiments of the disclosure, a method includes blocking rotation of a rotating screw portion of a screw assembly via a locked position of a self-lock clutch. The screw assembly is coupled to an actuation stem of an actuator. The screw assembly includes a translating screw portion coupled to the rotating screw portion. The method also includes enabling rotation of the rotating screw portion via an unlocked position of the self-lock clutch. Enabling rotation includes moving the self-lock clutch from the locked position to the unlocked position in response to a torque applied by a drive section to the self-lock clutch.

In embodiments of the disclosure, a system includes a valve assembly having a valve disposed in a valve body. The system also includes an actuator coupled to the valve assembly. The actuator includes a screw assembly coupled to the actuation stem. The screw assembly includes a rotating screw portion coupled to a translating screw portion. The actuator also includes a gear assembly coupled to the screw assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
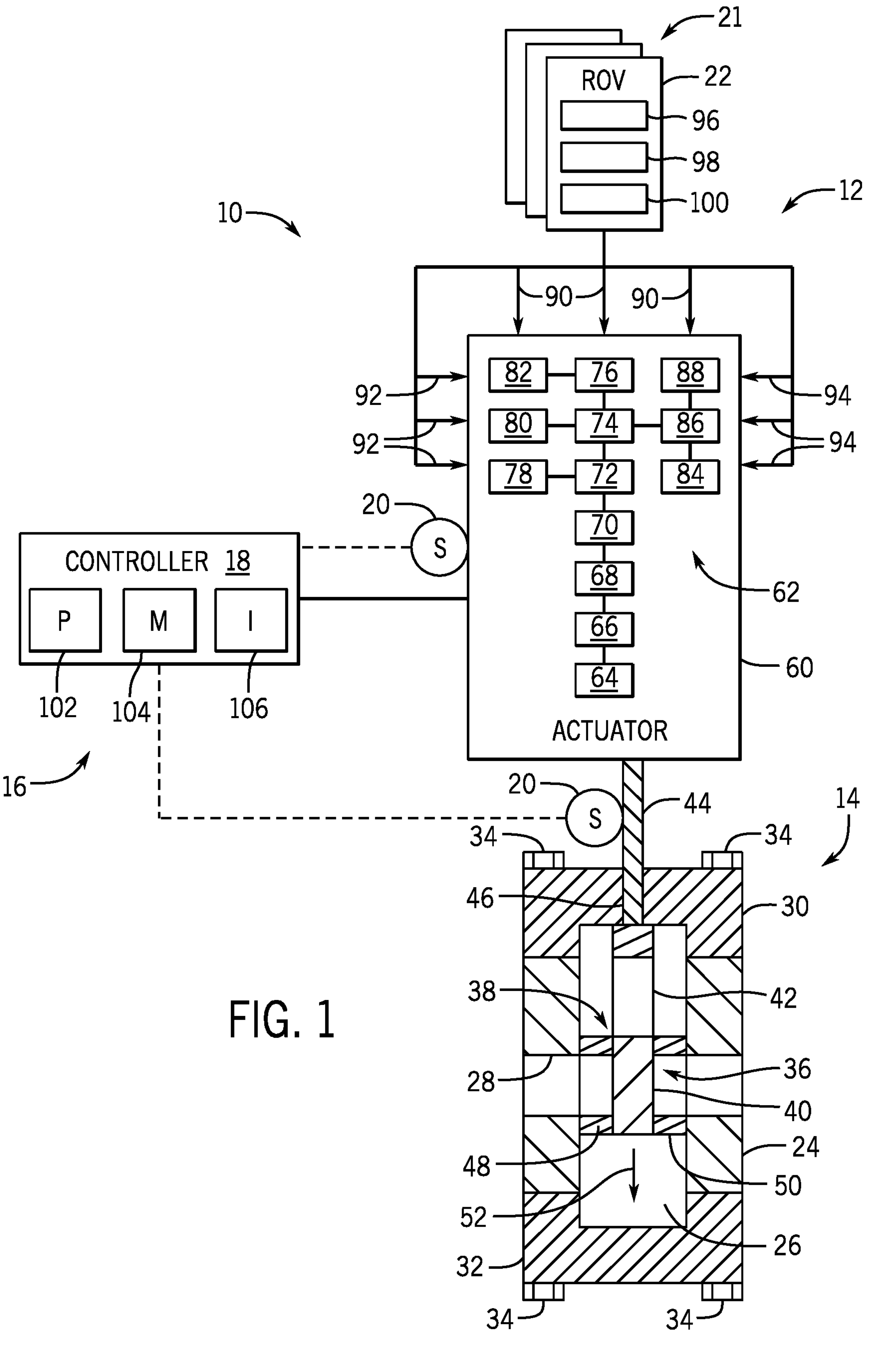
FIG. 1 is a block diagram of an embodiment of a fluid flow control system having an actuation system coupled to a valve assembly.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . " The articles "a," "an," "the," and "said" are intended to mean that there are one or more of the elements. Any use of any form of the terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

In certain embodiments as discussed in detail below, an actuation system is provided to overcome disadvantages of previous spring-biased actuators. For example, in certain embodiments, an actuator for a valve may include a gate valve assembly, wherein a gate of the gate valve assembly is coupled to a valve stem. The valve stem may be coupled to an actuator mechanism or assembly, which provides a linear motion to move the gate between open and closed positions. In certain embodiments, the actuator mechanism may include a drive section coupled to a driven section. The drive section may generate or receive a driving force, such as a torque generated by an electric drive of the actuator mechanism or received from an external tool (e.g., torque tool). In any case, the driving force provided by the drive section may cause a torque to be applied to the driven section.

The driven section may receive the torque from the drive section and convert the torque from rotary to linear motion. For example, the drive section may include a screw assembly having a translating screw portion (e.g., a roller screw or a ball screw) and a rotating screw portion (e.g., a nut). A stem coupler may couple the translating screw portion to the valve stem, such that linear motion of the translating screw portion is transferred to the valve stem to close or open the valve. In some embodiments, the torque may be transferred to the driven section via a gear assembly, which provides a mechanical advantage for the torque to operate the screw assembly. Bearings also may be provided at the screw mechanism to withstand thrust and torsional loads. The electric drive or the external tool may provide the torque to rotate the nut, causing the screw mechanism to translate in a linear direction depending on the rotational direction. Additionally, the screw mechanism may be coupled to the valve stem via the stem coupler. In this way, the driven section transforms rotary motion into linear motion to close or open the valve.

The actuator mechanism may also include a self-lock clutch interposed between the drive section and the driven section, such that the torque transmitted from the drive section to the driven section is transmitted through the self-lock clutch. In some embodiments, the self-lock clutch may include an input shaft connected to the drive section and an output shaft connected to the driven section. The torque may be transmitted from the drive section to the input shaft, from the input shaft to the output shaft, and from the output shaft to the driven section. However, in some situations, the self-lock clutch may block transmission of torque between the output shaft and the input shaft depending on a position of the self-lock clutch. When the torque is applied to the input shaft (e.g., by the electric drive or the external tool), the self-lock clutch may move to an unlocked position, enabling motion of the actuator mechanism. Otherwise, the self-lock clutch is engaged in a locked position, such that the self-lock clutch holds the position of the actuator mechanism and blocks movement in any direction. That is, the position of the actuator mechanism and the valve may be locked as long as no torque is applied to the input shaft. As a result, any torque applied via the output shaft will not unlock the self-lock clutch, and thus the actuator mechanism and the valve will not change positions. For example, when no power is supplied to the electric drive, the self-clutch lock may lock the actuator mechanism in an as-is position. In certain embodiments, the self-lock clutch operates only via mechanical power (e.g., application of torque), and thus does not use any electrical power or fluid pressure (e.g., hydraulics or pneumatics).

When electric power is unavailable, or when the electric drive is inoperable, embodiments of the disclosure include a drive interface for receiving the torque (e.g., from the external tool). For example, a torque bucket provided for a remotely operated vehicle (ROV) may be configured to receive an ROV tool from the ROV. The ROV tool may provide the torque that is conveyed to the input shaft, unlocking the self-lock clutch. The ROV tool may be hydraulic or electric and may have gear trains to ensure adequate torque and RPM is provided. In some embodiments, the drive interface is coupled to the input shaft, and the electric drive is a retrievable drive module removably attached to the drive interface. In this way, the actuator may be modularly equipped with the electric drive, enabling efficient installation, replacement, customization, and/or removal of the electric drive.

In certain embodiments, the electric drive may be offset from an axis of the screw assembly. For example, the drive interface, the self-lock clutch, and the screw assembly may be coupled in series along a central axis while the electric drive (e.g., the retrievable drive module) is aligned along an offset axis parallel to the central axis. The electric drive may drive the input shaft via an offset gear assembly having a driver gear on the offset axis configured to drive a driven gear on the central axis. The electric drive (e.g., the retrievable drive module) may be positioned on a side of the gear assembly extending away from the valve, such that the electric drive may be easily retrieved (e.g., by an ROV). Alternatively, the electric drive may be positioned on the other side of the gear assembly extending toward the valve. In either case, the offset configuration may provide a compact form for the actuator.

In certain embodiments, visual indication of the valve in open or close position might also be provided. Such visualization may be provided on the ROV bucket and the mechanism that connects to the valve stem. With the foregoing in mind, the following discussion presents embodiments of an actuator as illustrated in FIGS. 1-12. The features and components discussed in detail below are intended for use in combination with one another, and like element numbers are used to reference components having the same functionality in the drawings.

FIG. 1 is a block diagram of an embodiment of a fluid flow control system 10 having an actuation system 12 coupled to a valve assembly 14, such as a gate valve assembly or a ball valve assembly. The fluid flow control system 10 may also include a control system 16 having one or more controllers 18 configured to control operation of the actuation system 12. The control system 16 includes one or more sensors 20 coupled to the actuation system 12 and the valve assembly 14. Each of the sensors 20 is configured to provide feedback to the controller 18 regarding a position of the actuation system 12 and/or the valve assembly 14. The fluid flow control system 10 may include one or more external tools 21, such as remotely operated vehicles (ROV) 22 (e.g., a subsea or underwater ROV having one or more ROV tools), configured to retrieve one or more components of the actuation system 12 and/or operate or override one or more components of the actuation system 12. As discussed in further detail below, the actuation system 12 may operate the valve assembly 14 with electricity from an energy storage unit, such as one or more batteries, during operation of the fluid flow control system 10. The energy storage unit may be charged by another power supply, such as a power grid, a solar panel, an electric generator, or a combination thereof. In certain embodiments, the actuation system 12 generally excludes a spring to bias the valve assembly 14 to a particular position, such as an open or closed position, in response to various events, such as an emergency situation. Instead, the actuation system 12 may use a built-in electric drive, a retrievable drive module (e.g., including electric drive and gear assembly), or an external tool (e.g., an ROV tool) to drive movement of the valve assembly 14 over all ranges of movement in directions toward both the open and closed positions in various conditions, including normal operation and emergency situations. Advantageously, as the actuation system 12 may exclude springs to bias the valve assembly 14, the actuation system 12 may experience less resistance to movement of the valve assembly 14 in certain directions, such as during emergency situations.

The valve assembly 14 includes a valve body 24 having a valve chamber 26 and a fluid passage or bore 28 extending through the valve body 24 in fluid communication with the valve chamber 26. The valve assembly 14 also includes one or more valve bonnets, such as valve bonnets 30 and 32, coupled to the valve body 24 via a plurality of threaded fasteners 34. The valve body 24 and the valve bonnets 30 and 32 collectively define the valve chamber 26, which is configured to house a valve 36, such as a gate valve, for movement between open and closed positions relative to the fluid passage 28. In the illustrated embodiment, the valve 36 includes a gate 38 having a solid gate portion 40 and a valve opening 42. The gate 38 in turn is coupled to a valve stem 44, which extends through a stem bore 46 in the valve bonnet 30. The gate 38 moves axially along an axis of the valve stem 44 along opposite valve seats 48 and 50 disposed between the gate 38 and opposite interior surfaces of the valve body 24. As illustrated, the valve assembly 14 is configured in a closed position, wherein the solid gate portion 40 is aligned with the fluid passage 28 and seals against the valve seats 48 and 50. During operation of the actuation system 12, the valve stem 44 moves axially along its central axis to move the gate 38 in a direction indicated by arrow 52, thereby positioning the valve opening 42 in line with the fluid passage 28 while the valve seats 48 and 50 are sealed about the valve opening 42. In this position, the valve assembly 14 is configured to enable fluid flow through the fluid passage 28 and the valve opening 42 in the gate 38. The valve assembly 14 is configured to move between the open and closed positions by moving the valve stem 44 with the actuation system 12.

The actuation system 12 includes an actuator 60 having a plurality of actuator components 62 disposed in one or more series arrangements, parallel arrangements, or a combination thereof. For example, the actuator components 62 may include actuator components 64, 66, 68, 70, 72, 74, 76, 78, 80, 82, 84, 86, and 88. These actuator components 62 may include one or more high efficiency screw assemblies (e.g., roller screw assemblies, ball screw assemblies, etc.), one or more gear trains or gear assemblies, one or more electric drives or motors, one or more brakes or self-lock clutches, one or more ROV overrides, one or more energy storage units, one or more power supplies, or any combination thereof. For example, the one or more gear assemblies of the actuator components 62 may include a plurality of gears (e.g., planetary gear assemblies, bevel gear assemblies, worm screw and gear assemblies, etc.) engaged with one another to provide a mechanical advantage for operating the valve assembly 14. The one or more electric drives or motors of the actuator component 62 may be powered by energy storage units, such as batteries or capacitors, to operate the valve assembly 14. The self-lock clutch may be configured to engage an input shaft and an output shaft to lock a position of the valve assembly 14 and the actuator 60 unless a torque is applied to the input shaft. That is, the actuator 60 may be normally locked to secure the position of the valve assembly 14 and to prevent back drive via the output shaft. When the torque is applied to the input shaft (e.g., by the electric drive or the ROV tool), the self-lock clutch may unlock the position of the actuator 60 to operate the valve assembly 14. However, if torque is applied to the output shaft (e.g., when the valve assembly 14 experiences fluid pressure that causes force on the valve stem and thus torque on the output shaft), then the self-lock cluck remains in a locked position. In certain embodiments, the self-lock clutch cannot be unlocked by any torque applied via the output shaft, thus ensuring no change in position of the valve assembly 14 unless intended via application of torque through the input shaft. The energy storage units may include one or more batteries, which may be charged by an electric source or power supply. The batteries or energy storage units generally power the electric drives during operation. However, if the power fails, then the self-lock clutch continues to lock the position of the valve assembly 14 and the actuator 60. In certain embodiments, the self-lock clutch operates only via mechanical power (e.g., application of torque via the input shaft), and thus does not use any electrical power or fluid pressure (e.g., hydraulics or pneumatics). The self-lock clutch may be unlocked upon receiving the torque via the drive interface, the electric drive, the retrievable drive module, the external tool (e.g., ROV tool), or a combination thereof. In the illustrated embodiment, the actuator components 64, 66, 68, 70, 72, 74, and 76 may include a screw assembly, one or more gear assemblies, one or more electric drives, one or more self-lock clutches, and/or a drive interface (e.g., an interface for the retrievable drive module, an interface for the external tool, or an ROV override).

The actuator components 72, 74, 76, 78, 80, 82, 84, 86, and 88 may include one or more electric drives that are retrievable by the ROV 22, one or more ROV override mechanisms configured to operate the actuator 60 if the electric drive is inoperable, or various other components to enable normal or override operation of the actuator 60 and the valve assembly 14. The ROV 22 may be configured to operate and or retrieve the various actuator components 62 in a variety of directions as indicated by arrows 90, 92, and 94. In particular, the ROV 22 may be configured to retrieve and/or operate one or more of the actuator components 62 (e.g., energy storage units, electric drives or motors, gear assemblies, self-lock clutches, brakes, etc.) in an axial direction along an axis of the valve stem 44 as indicated by arrows 90, or the ROV 22 may be configured to retrieve and/or actuate one or more of the actuator components 62 in a lateral direction relative to the axis of the valve stem 44 as indicated by arrows 92 and 94. In the illustrated embodiment, the ROV 22 may include one or more drives 96, energy storage units 98, and controllers 100. The drives 96 may include electric drives or motors, fluid drives or motors, or any combination thereof. For example, the fluid drives or motors may include hydraulic and/or pneumatic drives or motors. The energy storage units 98 may include one or more batteries, capacitors, such as super capacitors, or other energy storage devices. The controller 100 may include a processor, memory, and instructions stored on the memory and executable by the processor to operate functions of the ROV 22. For example, the controller 100 may control the drives 96 to operate an axial movement of an ROV actuator, a rotational movement of an ROV actuator, or some other movement of the ROV 22.

The actuator 60 includes a drive section and a driven section, wherein the drive section provides the driving force to operate the driven section. The self-lock clutch may be a torque control coupling, which connects the drive section and the driven section and selectively controls (e.g., enables or disables) the transmission of torque therebetween. In other words, if power is transmitted from the drive section to the driven section in a "forward" direction (e.g., from input shaft to output shaft, or from left to right in FIGS. 6-10), then actuator components 62 positioned behind the self-lock clutch (e.g., drive torque input side) may be part of the drive section, and actuator components 62 positioned ahead (e.g., driven torque output side) of the self-lock clutch may be part of the driven section. The drive section may include actuator components 62, which generate the torque, receive the torque, receive electrical or manual power, or transmit the torque to the driven section. For example, the drive section may include the electric drive, the drive interface (e.g., an ROV override, interface for external tool, or interface for retrievable drive module), electrical connections, a battery, gears, and/or any other components, which manipulate energy (e.g., kinetic energy, mechanical energy, electrical energy) in the actuation system 12 prior to receipt of the energy at the input shaft of the self-lock clutch. That is, actuator components 62 that cause or enable torque to be applied to the input shaft are part of the drive system. An external power source, such the ROV 22 or a power supply, may be understood as providing power to the drive section of the actuator 60, rather than being part of the actuator 60. In some embodiments, the power supply includes an energy storage unit (e.g., battery) coupled to the electric drive. In some embodiments, the drive section may be entirely mechanical, lacking an inherent power source (e.g., the electric drive) and relying on an external tool 21 (e.g., via the ROV 22) to supply the torque via the drive interface. However, the external tool 21 may include an electric drive, a fluid drive (e.g., hydraulic drive or pneumatic drive), or another suitable power source to provide the torque via the drive interface.

On the other hand, the driven section may include any of the actuator components 62, which convert the energy supplied by the drive section into translational motion. For example, the driven section may include the gear assembly, the screw assembly, and the valve assembly. These components receive the energy as rotational energy provided via the output shaft of the self-lock clutch. As discussed above, the self-lock clutch may block motion of the actuator 60 except when the torque is applied to the input shaft of the self-lock clutch. In some embodiments, the input shaft may be part of the drive section, the output shaft may be part of the driven section, and the self-lock clutch may receive and couple the input shaft and the output shaft.

In some embodiments, the control system 16 may include one or more controllers 18 and one or more sensors 20 coupled to the actuation system 12 and the valve assembly 14. In the illustrated embodiment, the sensors 20 may be coupled to the valve stem 44 and one or more of the actuator components 62 to monitor a position of the valve stem 44 and/or the actuator components 62. For example, the monitored position may correspond to a rotational position, an axial position, or a combination thereof that indicates a position of the gate 38 of the valve assembly 14, such as a relative position between the open and closed positions. The illustrated controller 18 includes one or more processors 102, memory 104, and instructions 106 stored on the memory 104 and executable by the processors 102 to perform various functions of the actuation system 12. For example, the controller 18 may receive and process sensor feedback from the one or more sensors 20, and then control the actuation system 12 to move a position of the gate 38 and/or lock a position of the gate 38. For example, the controller 18 may be configured to control or operate the electric drive and/or energy storage unit to enable movements of the gate 38 between the open and closed positions. In certain embodiments, the controller 18 may control the actuator 60 to secure the position of the gate 38 and/or move the gate 38 to an open position or a closed position in response to sensor feedback from the sensors 20. Again, the actuator 60 may operate with one or more electric drives using electricity from one or more energy storage units (e.g., batteries), such that the actuator 60 is able to operate with or without an external power supply (e.g., power grid). In certain embodiments, an external power supply may be used to supply power for charging the energy storage units (e.g., batteries). Additionally, in certain embodiments, the external power supply may be used to provide a primary power for operating the electric drive of the actuator 60, while the energy storage units (e.g., batteries) provide a secondary power for operating the electric drive of the actuator 60 when the primary power is unavailable.

Certain embodiments may include or exclude any of the actuator components 62. For example, the present disclosure specifically illustrates and describes five configurations A-E of the actuator 60, each configuration having a different combination and arrangement of the actuator components 62. Features of each of the five configurations A-E are summarized in the table below. For each of the configurations, the table identifies each element associated with each reference number. For example, in configuration A, reference number 64 refers to the valve assembly. Additionally, the table indicates the corresponding figures associated with each of the configurations. It should be noted that the present disclosure is not limited to the five configurations A-E, and that other embodiments may include fewer or additional actuator components and/or combinations thereof.

| | Configuration | | | | |
|---|---|---|---|---|---|
| Reference number | A (FIGS. 2, 6) | B (FIGS. 3, 7) | C (FIGS. 4, 8) | D (FIGS. 5, 9) | E (FIGS. 5, 10) |
| 66 | Valve assembly | Valve assembly | Valve assembly | Valve assembly | Valve assembly |
| 68 | Screw assembly | Screw assembly | Screw assembly | Screw assembly | Screw assembly |
| 70 | Gear assembly | Gear assembly | Gear assembly | Gear assembly | Gear assembly |
| 72 | Self-lock clutch | Self-lock clutch | Self-lock clutch | Self-lock clutch | Self-lock clutch |
| 74 | Electric drive | ROV override | ROV override | Central axis gear | Central axis gear |
| 76 | ROV override | | Electric drive | ROV override | ROV override |
| 78 | | | | | |
| 80 | | Position indicator | | | |
| 82 | Position indicator | | Position indicator | Position indicator | Position indicator |
| 84 | | | | Electric drive | |
| 86 | | | | Offset axis gear | Offset axis gear |
| 88 | | | | | Electric drive |

FIGS. 2-6 are block diagrams of embodiments of the fluid flow control system 10 of FIG. 1, further illustrating embodiments of the actuation system 12 having various configurations of the actuator components 62, the ROVs 22, and the sensors 20. Specifically, FIGS. 2-6 correspond to configurations A-E as discussed above with reference to FIG. 1.

Figure 2:
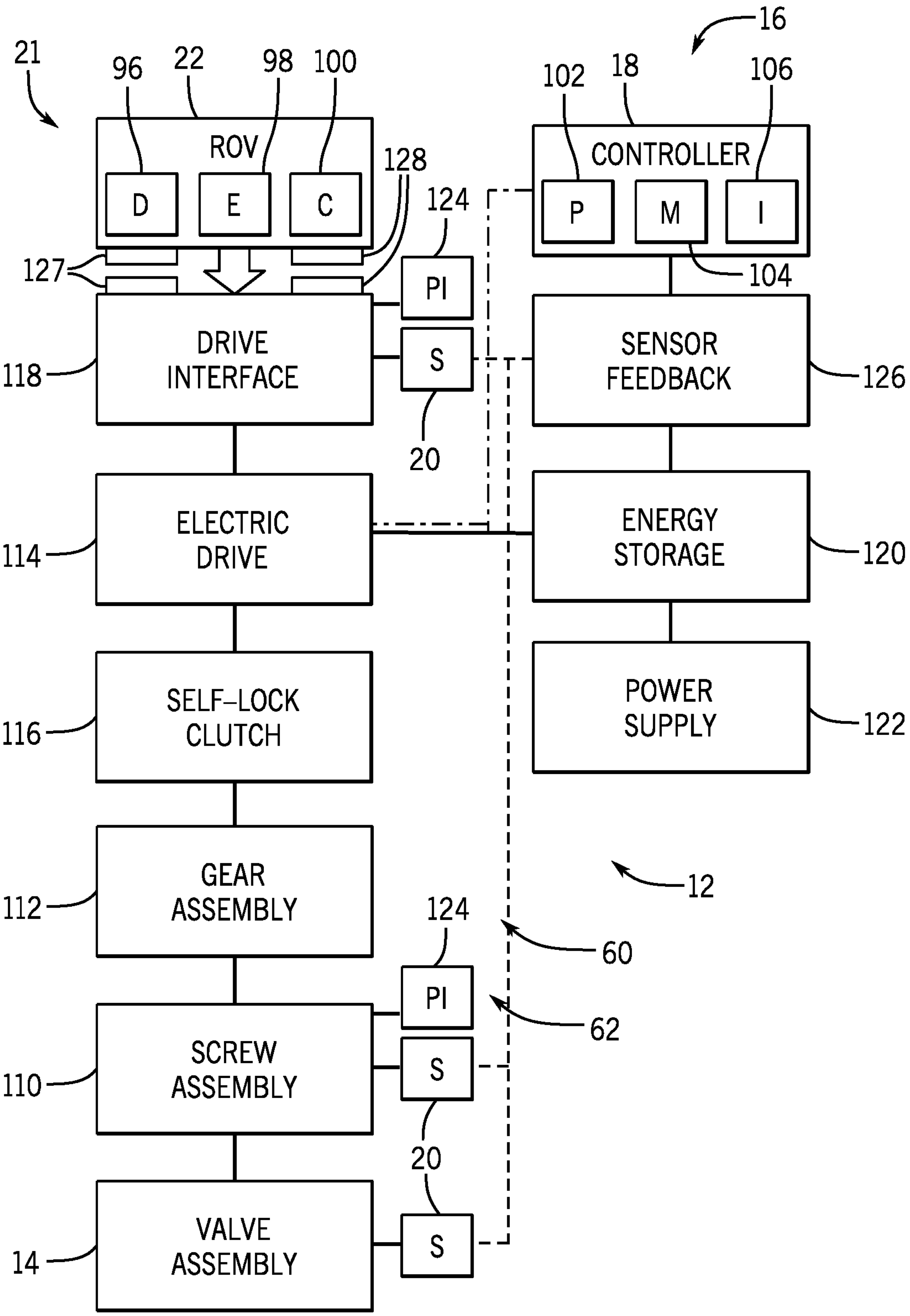
FIG. 2 is a block diagram of an embodiment of the fluid flow control system of FIG. 1, illustrating an actuator of the actuation system having a series arrangement of a screw assembly, a gear assembly, a self-lock clutch, an electric drive, and an override.

As illustrated in FIG. 2, configuration A includes the actuator 60 of the actuation system 12 having a series arrangement of actuator components 62, including a screw assembly 110, a gear assembly 112 (e.g., a gear box, a gear train, etc.), a self-lock clutch 116, an electric drive 114, and a drive interface 118. The drive section includes the electric drive 114 and the drive interface 118, while the driven section may include the gear assembly 112 and the screw assembly 110. The drive interface 118 may include a ROV interface or ROV override configured to interface with the ROV 22 to override operation of the actuator 60 otherwise driven by the electric drive 114. In some embodiments, the drive interface 118 may include a torque bucket or torque tool interface configured to receive an external torque tool, such as the ROV tool from the ROV 22, a manual torque tool, or a powered torque tool (e.g., electric drive operated torque tool), and/or a retrievable drive unit, and transmit the torque to the rest of the actuator 60. The actuation system 12 also includes one or more energy storage units 120, such as batteries, fuel cells (e.g., hydrogen fuel cells), or supercapacitors, electrically coupled to the electric drive 114. The energy storage unit 120 is also electrically coupled to a power supply 122, which may include an electrical connection with a power grid, an electric generator (e.g., an engine driven generator, a hydro turbine generator, or a wind turbine generator), a solar powered system, or any combination thereof. During normal (non-override) operation, the electric drive 114 is configured to apply the torque to drive the input shaft of the self-lock clutch 116, which in turn transfers torque to the output shaft of the driven section (e.g., gear assembly 112 and screw assembly 110) coupled to the valve assembly 14. In an embodiment, the electric drive 114 may include a redundant electric motor tied to a primary motor as a contingency. If the motors are fixed in relation to each other, during ROV override operations, the connected motors will act as a generator and the electrical energy may be used to charge the batteries.

In situations where the electric drive 114 is inoperable (e.g., insufficient power, malfunction, end of life, etc.), the drive interface 118 is configured to receive the torque from an external source or tool, such as the ROV 22 (e.g., via the ROV tool)), and apply the torque to the input shaft. In some embodiments, the drive interface 118 may turn a rotor of the electric drive 114, thereby "overriding" the electric drive 114. When the input shaft turns due to the torque, the self-lock clutch 116 may unlock to enable the input shaft to drive the output shaft coupled to the driven section. As long as the input shaft is not turning (e.g., after the valve assembly 14 is moved to the desired position), the self-lock clutch 116 may lock to disable movement of the output shaft and the input shaft. It should be noted that a torque applied to the output shaft (e.g., a back drive) may not unlock the self-lock clutch. In this way, the torque may be transmitted from the drive section to the driven section and not from the driven section to the drive section.

The output shaft may be configured to drive the gear assembly 112, which provides a mechanical advantage to drive the screw assembly 110. The screw assembly 110 in turn converts the torque into a linear force to drive the valve assembly 14, such as by linearly moving the gate 38 between the open and closed positions. The gear assembly 112 may include a plurality of gears coupled together to provide the mechanical advantage between the drive section and the screw assembly 110. For example, the gear assembly 112 may include one or more planetary gear assemblies, bevel gear assemblies, or gear trains having multiple gears with different numbers of teeth engaged with one another, thereby providing a gear ratio suitable to increase a mechanical advantage between the drive section and the screw assembly 110. In some embodiments, the gear assembly 112 may be located on the other side of the self-lock clutch 116 as part of the drive section. That is, the electric drive 114 or the drive interface 118 may apply the torque to a drive gear of the gear assembly 112, which in turn provides the mechanical advantage to drive the input shaft of the self-lock clutch 116. In other embodiments, the gear assembly 112 may be part of the electric drive 114.

In the illustrated embodiment, the screw assembly 110 includes a male threaded shaft coupled with a female threaded nut, such that rotational movement of the female threaded nut may be converted into linear movement of the male threaded shaft. In other embodiments, rotational movement of the male threaded shaft may be converted into linear movement of the female threaded nut. In any case, the torque causes a rotating screw portion of the screw assembly 110 to linearly move a translating screw portion of the screw assembly 110. The screw assembly 110 may include a roller screw mechanism having a plurality of rollers, a ball screw mechanism having a plurality of balls, or any other suitable low friction elements or bearings along the threaded connection between male and female threaded members.

The drive interface 118 may include a ROV interface or ROV override configured to receive the ROV 22, such that the ROV 22 can operate the actuation system 12 and the valve assembly 14 when the electric drive 114 is not operating or lacks power from the energy storage unit 120. For example, the ROV 22 may use one or more of the drives 96 to apply a linear motion and/or a rotational motion to move the gear assembly 112, the screw assembly 110, and the valve assembly 14. The one or more drives 96 may be configured to operate the ROV tool (e.g., a torque tool). In addition, the ROV 22 and the drive interface 118 may each include a mechanical coupling 127 configured to secure a mechanical connection between the ROV 22 and the ROV override. For example, the mechanical couplings 127 may mate to one another via a latching, clamping, magnetic, socket, or locking mechanism. Additionally, the ROV 22 and the drive interface 118 may each include an electrical coupling 128 configured to mate to one another to establish and secure an electrical connection between the ROV 22 and the actuator 60. The electrical connection may enable transmission of electrical power from the energy storage units 98 of the ROV to the electric drive 114, the control system 16, and/or the energy storage units 120. In some embodiments, the electrical connection may enable mechanical operation of the drive interface 118 (e.g., by opening a receptacle for the ROV tool). While the illustrated embodiment provides the drive interface 118 as an example of the drive interface for the ROV 22, the drive interface 118 may be configured to couple with any one or more external tools 21, such as manual torque tools, electric powered torque tools (e.g., electrical drive operated torque tools), fluid driven torque tools (e.g., hydraulic or pneumatic powered torque tools), retrievable drive units (e.g., electric drive and gear assembly), or any combination thereof. Accordingly, each illustration and discussion of the ROV 22 interfacing with and transferring torque (or other motion) through the drive interface 118 is intended to cover each of the examples noted above for possible external tools 21. The present disclosure is not limited with regard to the nature of the drive interface, the tool, and the vehicle of the tool. For example, in a surface (above-sea) application, the drive interface may be a receptacle for a manual torque wrench operated by a technician or a robot.

In the illustrated embodiment, the controller 18 is coupled to sensors 20 disposed at the valve assembly 14 and the drive interface 118. The sensor 20 disposed at the valve assembly 14 may be configured to monitor a position of the valve stem 44 and/or the gate 38 as illustrated in FIG. 1. The sensor 20 disposed at the drive interface 118 may be configured to monitor a position and/or movement of the ROV 22 and the drive interface 118 that moves the gear assembly 112 and the screw assembly 110. Additionally, the drive interface 118 may include a position indicator 124, which may provide a visual indication of a position of the ROV 22, the drive interface 118, and the valve assembly 14. For example, the position indicator 124 may include an electronic display, a mechanical gauge, a marker that moves along a plurality of indicia, or any combination thereof, configure to indicate a relative position of the gate 38 between open and closed positions of the valve assembly 14. In some embodiments, the position indicator 124 may be attached to the screw assembly 110, such that the position indicator 124 moves as the screw assembly 110 moves. For example, the position indicator 124 may be coupled to the translating screw portion of the screw assembly 110, such that the position of the position indicator 124 reflects the position of the translating screw portion and, by extension, the valve assembly 14.

As illustrated, the controller 18 receives sensor feedback 126 from the sensors 20 and the energy storage unit 120. For example, the sensor feedback 126 may include a position of the drive interface 118, a position of the gate 38 in the valve assembly 14, a charge state or power level of the energy storage unit 120, a power supply state of the power supply 122, or any combination thereof. The controller 18 is configured to use the sensor feedback 126 to control operation of the actuation system 12, such as an on or off state of the electric drive 114, a position of the valve assembly 14 between open and closed positions, or any combination thereof. The sensor feedback 126 also may include other operational feedback, such as information about the fluid flowing through the valve assembly 14, environmental conditions, oil and gas equipment conditions, or any combination thereof. In the illustrated embodiment, the self-lock clutch 116 is disposed between the electric drive 114 and the gear assembly 112. However, the actuator 60 may have other configurations of these components as discussed below.

Figure 3:
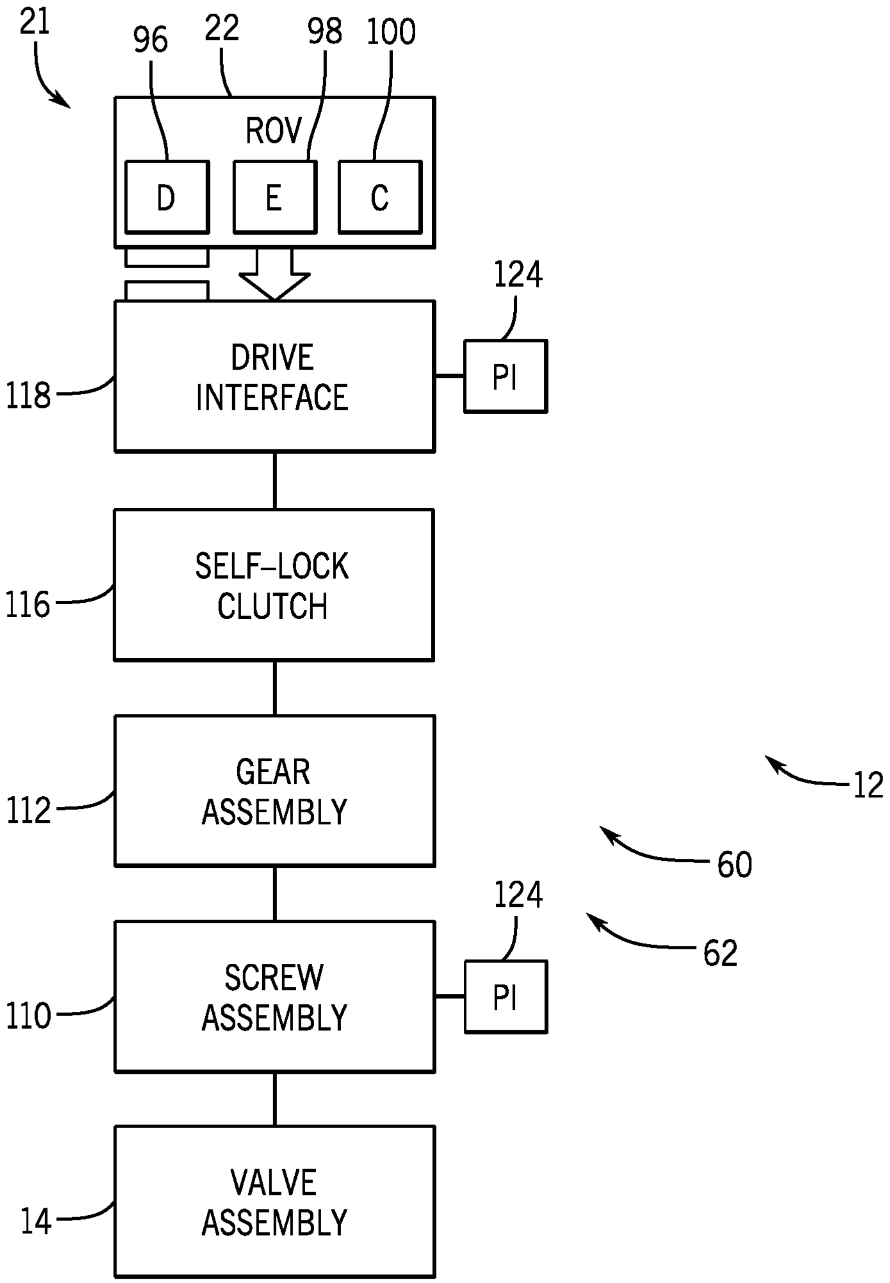
FIG. 3 is a block diagram of an embodiment of the fluid flow control system of FIG. 1, illustrating an actuator of the actuation system having a series arrangement of a screw assembly, a gear assembly, a self-lock clutch, and an override.

FIG. 3 is a block diagram of an embodiment of the fluid flow control system 10 of FIG. 1, further illustrating configuration B of the actuator 60 as discussed above with reference to FIG. 1. In configuration B, the actuation system 12 enables mechanical operation of the valve assembly 14 without the electric drive 114, the control system 16, a power source, or any electrical components built into the actuator 60. That is, the actuator 60 may not be configured to generate the torque at all. As such, the actuator 60 also excludes the electrical couplings 128, the sensors 20, the energy storage unit 120, the power supply 122, and the sensor feedback 126 of configuration A as described above with reference to FIGS. 1 and 2. Instead, the drive section may operate only by receiving the torque from an external tool 21, such as the ROV 22, via the drive interface 118. Upon receiving the torque from the external tool 21 (e.g., the ROV 22), the drive interface 118 may drive the input shaft of the self-lock clutch 116 without the electric drive 114 interposed therebetween, as described with reference to configuration A and FIG. 2.

For example, the drive interface 118 may couple to the input shaft of the self-lock clutch 116. Alternatively, the input shaft may be part of the drive interface 118 or the ROV 22, and the self-lock clutch 116 may receive the input shaft. All other aspects of the fluid flow control system 10 of FIG. 3 are the same as discussed above with reference to configuration A and FIG. 2. Accordingly, the actuator 60 has a series arrangement of the screw assembly 110, the gear assembly 112, the self-lock clutch 116, and the drive interface 118. In configuration B, the drive section includes the drive interface 118 without the electric drive 114, and the driven section is the same as the driven section of configuration A. The self-lock clutch 116 connects the drive interface 118 to the driven section, maintaining the same locking and unlocking behavior described above. That is, when the torque is applied to the input shaft via the drive interface 118 and/or the ROV 22, the self-lock clutch 116 may unlock to transmit the torque to the output shaft of the driven section, thereby driving the gear assembly 112, the screw assembly 110, and the valve assembly 14. As discussed above, the drive interface 118 may interface with any suitable external tool 21, such as a manual torque tool, an electric powered torque tool (e.g., electrical drive operated torque tools), a fluid-driven torque tool (e.g., hydraulic or pneumatic powered torque tool), a retrievable drive unit (e.g., electric drive and gear assembly), or any combination thereof.

Figure 4:
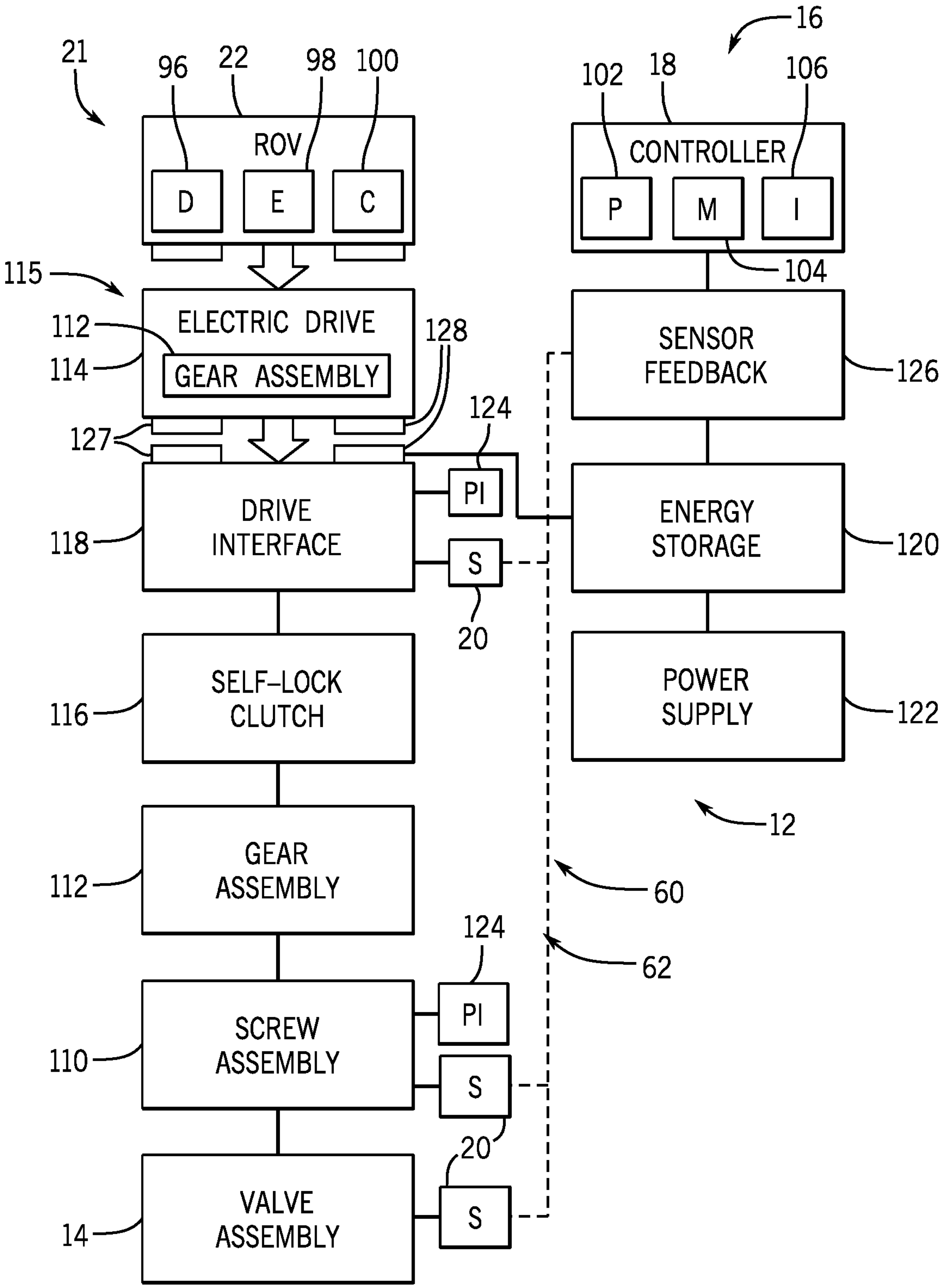
FIG. 4 is a block diagram of an embodiment of the fluid flow control system of FIG. 1, illustrating an actuator of the actuation system having a series arrangement of a screw assembly, a gear assembly, a self-lock clutch, an override, and an electric drive.

FIG. 4 is a block diagram of an embodiment of the fluid flow control system 10 of FIG. 1, further illustrating configuration C of the actuator 60 as discussed above with reference to FIG. 1. In configuration C, a retrievable drive module 115 may be removably attached to the drive interface 118, wherein the retrievable drive module 115 includes the electric drive 114 and a gear assembly 112. That is, the ROV 22 may transport and install the retrievable drive module 115 (e.g., electric drive 114 and gear assembly 112) onto the drive interface 118. After the retrievable drive module 115 is installed at the drive interface 118, the actuator 60, including the electric drive 114, may operate independently of the ROV 22. Additionally, the retrievable drive module 115 (e.g., electric drive 114 and gear assembly 112) may be removed from the drive interface 118, rendering the actuator 60 without an active drive mechanism. When the retrievable drive module 115 is not installed at the drive interface 118, the actuator 60 may operate relying on receiving the torque from the ROV 22 via the drive interface 118, similarly to configuration B of FIG. 3. In this way, configuration C provides more than one mode of operation, including an independent mode with the retrievable drive module 115 (e.g., electric drive 114 and gear assembly 112) and an intervention mode without the retrievable drive module 115, wherein the intervention mode may rely on an external tool 21 (e.g., ROV 22) coupling at the drive interface 118. As such, the drive section includes the drive interface 118 and may include the retrievable drive module 115 and/or the external tool 21. The retrievable drive module 115 may be removed and replaced with another external tool 21, such as a different retrievable drive module, a different type of drive such as a fluid drive, or the ROV 22. The actuator 60 is scalable by changing the roller screw capacity, gear ratios, and/or motor size to suit different gate valves sizes.

The retrievable drive module 115 may be removably attached to the drive interface 118 via the mechanical couplings 127 located on the drive interface 118 and the electric drive 114. That is, the mechanical couplings 127 may mate to physically secure the retrievable drive module 115 to the drive interface 118. The retrievable drive module 115 may also include an electrical coupling 128 configured to mate to the electrical coupling 128 of the drive interface 118. The electrical coupling 128 of the drive interface 118 may receive electrical power from the energy storage units 120, such that the electrical power may power the electric drive 114 when the electrical couplings 128 of the drive interface 118 and the electric drive 114 are mated to one another. When the retrievable drive module 115 is not installed at the drive interface 118, the ROV 22 may connect to the drive interface 118 via the mechanical couplings 127 of the ROV 22 and the drive interface 118, similarly to configuration B of FIG. 3.

It may be desirable to minimize the size or mass of the actuator 60 when the retrievable drive module is removed. Therefore, in some embodiments, the gear assembly 112 may be part of the removable drive module (e.g., in the electric drive 114) instead of occupying space in the driven section. By relocating the gear assembly 112 to the retrievable drive module, the size and mass of the rest of the actuator 60 may be reduced.

Figure 5:
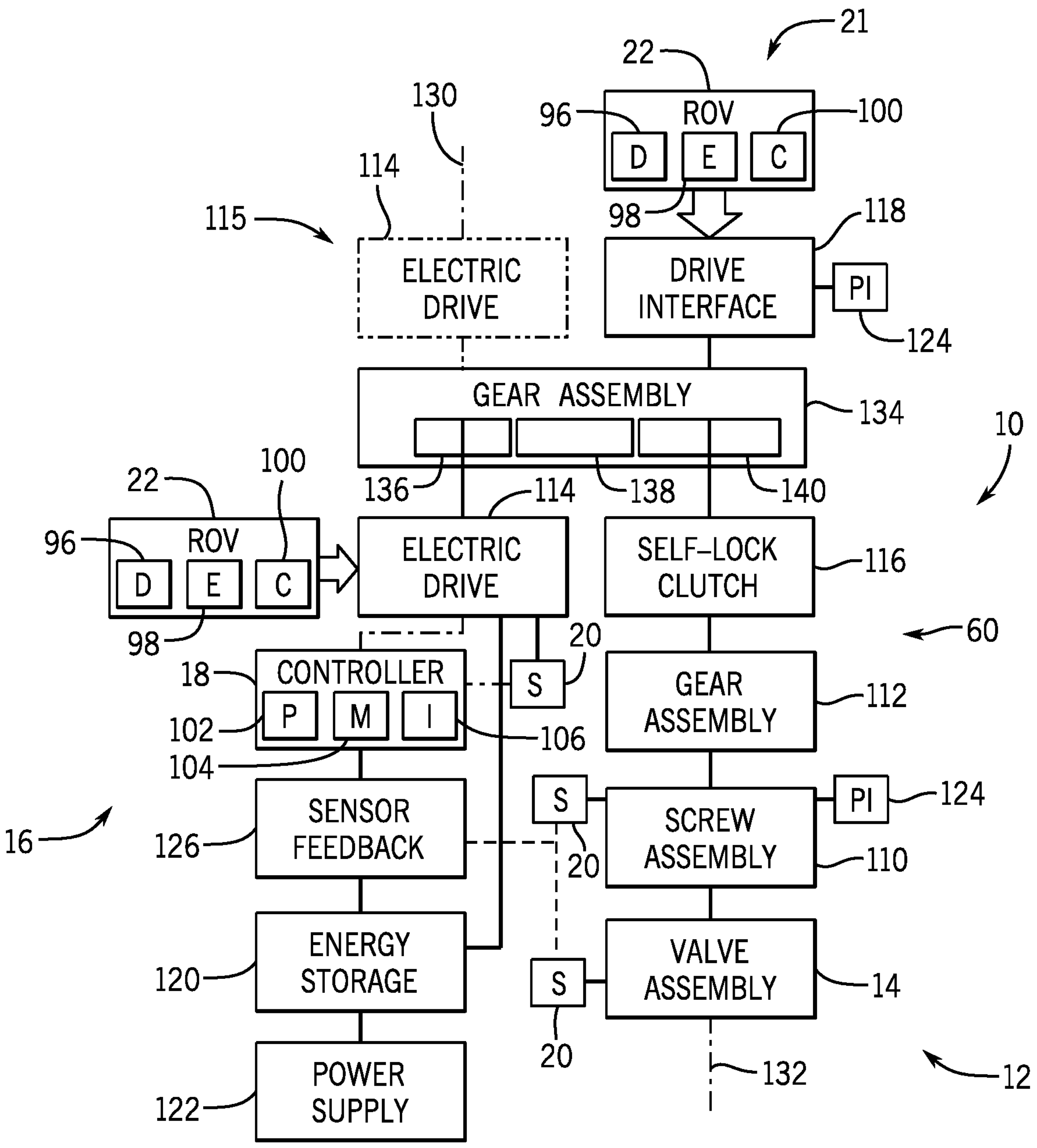
FIG. 5 is a block diagram of an embodiment of the fluid flow control system of FIG. 1, illustrating an actuator of the actuation system having an electric drive offset from a series configuration of a screw assembly, a gear assembly, a self-lock clutch, and an override.

FIG. 5 is a block diagram of an embodiment of the fluid flow control system of FIG. 1, further illustrating configurations D and E of the actuator 60 as discussed above with reference to FIG. 1. As illustrated, configuration D corresponds to the actuator 60 having the electric drive 114 in a first position shown with a solid box (e.g., next to the self-lock clutch 116 and the gear assembly 112), whereas configuration E corresponds to the actuator 60 having the electric drive 114 in a second position shown with a dashed box (e.g., next to the drive interface 118 and the external tool 21). Unless stated otherwise, the following discussion of FIG. 5 refers to both configurations D and E. In configurations D and E, the valve assembly 14, the screw assembly 110, the gear assembly 112, the self-lock clutch 116, and the drive interface 118 are aligned in a series arrangement extending along a central axis 132. In contrast, the electric drive 114 (configurations D and E) is positioned along an offset axis 130 shifted laterally to the side of the central axis 132. In other words, the axes 130 and 132 may be parallel but laterally offset from one another. The actuator 60 also includes a gear assembly 134, which may include a gear 136 (e.g., electric drive gear), an intermediate or idler gear 138, and a gear 140 (e.g., drive interface gear). The gear 140 is aligned along the central axis 132 in a series arrangement between the drive interface 118 and the self-lock clutch 116. As such, rotation of the gear 140 drives rotation of the input shaft of the self-lock clutch 116. Along the central axis 132, the external tool 21 (e.g., ROV 22) may generate a torque to turn the gear 140 via the drive interface 118. Additionally, the electric drive 114 may generate a torque along the offset axis 130, which torque is in turn transmitted to the gear 136, to the idler gear 138, to the gear 140, and to the input shaft of the self-lock clutch 116. That is, the torque that turns the gear 140 and the input shaft may originate from the electric drive 114 (e.g., configurations D and/or E) or from the external tool 21 (e.g., ROV 22), depending on a desired operational mode. For example, the actuator 60 may normally be driven by the electric drive 114. However, if the electric drive 114 is inoperable due to insufficient power, a malfunction, or another problem, then the external tool 21 (e.g., ROV 22) may drive the actuator 60 via the drive interface 118 without modification to configurations D and E. In other words, configurations D and E enable either the external tool 21 (e.g., via the drive interface 118) or the electric drive 114 to drive the actuator 60.

Configurations D and E are configured to help minimize the length of the actuator 60 by positioning the electric drive 114 along the offset axis 130. An advantage of configurations D and E is that relocating the electric drive 114 to the offset axis 130 eliminates a length of the actuator 60 along the central axis 132 that would otherwise be occupied by the electric drive 114. In this way, the length of the actuator 60 may be reduced because the electric drive 114 contributes less or zero additional length to the actuator 60. For example, compared to configuration A, configurations D and E may be more compact, because the electric drive 114 does not add length to the series arrangement of the actuator components 62.

The particular placements of the electric drive 114 in configurations D and E each provide benefits for the actuator 60. For example, in configuration D, the electric drive 114 (solid box) is positioned toward the front of the actuator, i.e., in the direction of the valve assembly 14. In this way, configuration D may simultaneously reduce the length of the actuator 60 while also protecting the electric drive 114 from potential damage via the adjacent actuator components 62. In other words, the lateral or offset positioning of the electric drive 114 (solid box) results in the driven section (e.g., screw assembly 110, gear assembly 112, self-lock clutch 116, and/or gear assembly 134) providing additional protection for the electric drive 114. Configuration E is the same as configuration D, except that the electric drive 114 (dashed box) is positioned on the axially opposite side of the gear assembly 134, toward the back of the actuator 60. In this way, configuration E may support the electric drive 114 being a retrievable drive module 115, removably attached to the gear assembly 134, similarly to configuration C as described above in reference to FIG. 4. The electric drive 114 being positioned toward the back of the actuator 60 may enable easier access by the ROV 22 to install and retrieve the electric drive 114 as part of the retrievable drive module 115.

In certain embodiments of configurations D and E, the gear assembly 134 may include any combination or arrangement of spur gears, belts, sprockets, chains, bevel gears, worm gears, a planetary gear assembly (e.g., sun gear, planet gears, and ring gear), and the like. Additionally, the gear assembly 134 may provide a mechanical advantage for the torque generated by the electric drive 114. In some embodiments, the drive interface 118 may be repositioned to the location of the illustrated electric drive 114 of configuration D (solid box) or configuration E (dashed box), wherein the external tool 21 (e.g., ROV 22) and/or the retrievable drive module 115 (e.g., electric drive 114 and gear assembly 112) may be removably coupled to the drive interface 118 for operating the actuator 60. In the foregoing embodiment, the self-lock clutch 116 also may be repositioned to a first location between the gear assembly 134 and the repositioned drive interface 118 (i.e., location of electric drive 114 (solid box)), or a second location between the gear assembly 134 and the repositioned drive interface 118 (i.e., location of electric drive 114 (dashed box).

The other aspects illustrated in FIG. 5 are the same as discussed in detail above with reference to FIGS. 1-4. For example, the elements having like element numbers have all of the features described above. The control system 16 is configured to receive the sensor feedback 126 from the sensors 20 and the energy storage units 120 to facilitate operation of the electric drive 114, self-lock clutch 116, and the position of the valve assembly 14.

Figure 6:
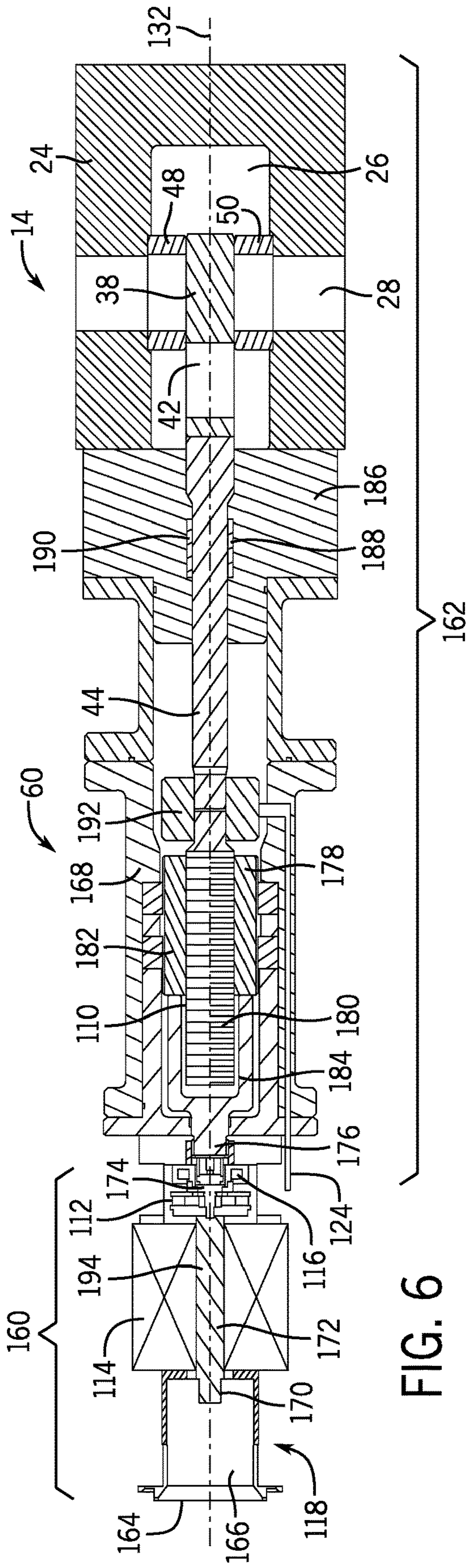
FIG. 6 is a cross-sectional side view of an embodiment of the fluid flow control system of FIGS. 1 and 2, further illustrating details of the actuation system as shown in FIG. 2.

FIG. 6 is a cross-sectional side view of an embodiment of the fluid flow control system 10 of FIG. 1, further illustrating details of the actuation system 12. In the illustrated embodiment, the actuator components 62 are arranged substantially the same as discussed above with reference to FIG. 2 (configuration A), except that the order of the gear assembly 112 and the self-lock clutch 116 are reversed in FIG. 6. However, the actuation system 12 of FIG. 6 may be arranged the same as FIG. 2 (configuration A) by reversing the order of the gear assembly 112 and the self-lock clutch 116 to match FIG. 2. In the illustrated embodiment, the actuator 60 has a series arrangement of the valve assembly 14, the screw assembly 110, the self-lock clutch 116, the gear assembly 112, the electric drive 114, and the drive interface 118. The series arrangement is aligned along the central axis 132. As shown, a drive section 160 of the actuator 60 includes the actuator components 62 to the left of the self-lock clutch 116 (e.g., the drive interface 118, the electric drive 114, and the gear assembly 112). A driven section 162 of the actuator 60 includes the actuator components 62 to the right of the self-lock clutch 116 (e.g., the screw assembly 110 and the valve assembly 14). In certain embodiments, the order of the gear assembly 112 and the self-lock clutch 116 may be reversed as noted above, such that the gear assembly 112 is part of the driven section 162 as depicted in FIG. 2 (configuration A). The actuator 60 is configured to move the gate 38 of the valve assembly 14 between the open and closed positions via movement of the valve stem 44.

In the illustrated embodiment, the drive interface 118 includes an external tool mount interface 164 (e.g., ROV mount interface) coupled to the electric drive 114, wherein the external tool mount interface 164 includes a tool receptacle 166 (e.g., ROV receptacle) extending axially toward the electric drive 114. The external tool mount interface 164 may include an annular wall or cup-shaped structure, which extends axially along the central axis 132. Accordingly, the tool receptacle 166 also may have an annular or cup-shaped structure. The drive interface 118 (e.g., external tool mount interface 164) is coupled to an actuator housing 168 of the actuator 60. The tool receptacle 166 also includes a tool drive interface 170 (e.g., ROV tool drive interface), which may include a tool interface to transmit torque into the actuator 60 via one or more shafts, such as shaft 172. The shaft 172 may be a rotor of the electric drive 114, or the shaft 172 may be coupled to the rotor. As such, the shaft 172 is configured to transmit the torque to the self-lock clutch 116. The tool drive interface 170 may have a hex head, a square head, a flat head, or another suitable tool interface configured to transmit torque (i.e., a torque transfer interface). The tool drive interface 170 also may be configured to transmit an axial motion from the external tool 21 (e.g., ROV 22) through the shaft 172 into the actuator 60.

As further illustrated, the shaft 172 is coupled to the gear assembly 112 and the self-lock clutch 116. In some embodiments, the self-lock clutch 116 may have an internal bore through which the shaft 172 extends, such that the shaft 172 is an input shaft 174 of the self-lock clutch 116. In other embodiments, the input shaft 174 of the self-lock clutch 116 is built-in to the self-lock clutch 116, and the shaft 172 is coupled to the input shaft 174. In either case, the shaft 172 may apply the torque to the self-lock clutch 116. Similarly, the self-lock clutch 116 may include an output shaft 176, or the self-lock clutch 116 may include an output bore through which the output shaft 176 extends. Upon unlocking the self-lock clutch 116, the output shaft 176 receives a torque transfer from input shaft 174. The torque transfer produced at the output shaft 176 causes rotation of a rotating screw portion of the screw assembly 110, which in turn cases translation of a translating screw portion of the screw assembly 110. For example, the output shaft 176 may be coupled to a female threaded portion 178 disposed about and mated to a male threaded portion 180 (e.g., a roller screw, a ball screw, and the like) of the screw assembly 110. The female threaded portion 178 may be the rotating screw portion and include a roller nut 182 attached to the output shaft 176 via an annular coupler 184. As such, the male threaded portion 180 may be the translating screw portion of the screw assembly 110. In other embodiments, the male threaded portion 180 may be the rotating screw portion coupled to the output shaft 176 and configured to cause translation of the female threaded portion 178.

In certain embodiments, the screw assembly 110 may be a roller screw assembly having a plurality of rollers between the female and male threaded portions 178 and 180, or the screw assembly 110 may be a ball screw assembly having a plurality of balls between the female and male threaded portions 178 and 180, or the screw assembly 110 may have one or more other types of low friction elements (e.g., bearings) between the female and male threaded portions 178 and 180. The rollers, balls, or other low friction elements (e.g., bearings) are configured to reduce friction during rotation while also withstanding thrust and torsional loads. The screw assembly 110 is configured to convert rotational motion to linear motion, or vice versa. However, the self-lock clutch 116 may be configured to block conversion of linear motion to rotational motion (e.g., back drive).

The male threaded portion 180 may be coupled to the valve stem 44 via a stem coupler 192. The valve stem 44 may extend through a valve bonnet 186 having an annular seal groove 188, which houses an annular seal 190 configured to enable the valve stem 44 to extend through the valve bonnet 186 while blocking matter from passing therethrough. The valve stem 44 be coupled at its end to the gate 38, which is configured to open or close the fluid passage 28. As further illustrated, the actuator 60 may include the position indicator 124 coupled to the driven section 162. For example, the position indicator 124 may be attached to the stem coupler 192 as shown, such that the position of the stem coupler 192 correlates with the position of the position indicator 124. The position indicator 124 may include an electronic display, a mechanical gauge, a marker that moves along a plurality of indicia, or any combination thereof, configured to indicate a relative position of the gate 38 between open and closed positions of the valve assembly 14. In some embodiments, the position indicator 124 may be attached to the screw assembly 110, such that the position indicator 124 moves as the screw assembly 110 moves. For example, the position indicator 124 may be coupled to the translating screw portion (e.g., male threaded portion 180), such that the position of the position indicator 124 reflects the position of the translating screw portion and, by extension, the valve assembly 14.

Accordingly, the external tool 21 (e.g., ROV 22) is configured to extend into the tool receptacle 166 and then rotate the tool drive interface 170 to transfer a torque through a combination of the shaft 172, the rotor 194, the gear assembly 112, the input shaft 174 of the self-lock clutch 116, the output shaft 176 of the self-lock clutch 116, the annular coupler 184, and the rotating screw portion (e.g., the female threaded portion 178). This rotation induced by the external tool 21 (e.g., ROV 22) in turn causes an axial movement of the translating screw portion (e.g., the male threaded portion 180) coupled to the valve stem 44 to drive axial movement of the gate 38 between the open and closed positions relative to the fluid passage 28.

Additionally, during normal operation, the electric drive 114 is configured to transfer torque through the gear assembly 112 to the annular coupler 184 and the female threaded portion 178, thereby driving the axial movement of the male threaded portion 180 coupled to the valve stem 44 to move the gate 38 between the open and closed positions relative to the fluid passage 28. Similar to operation of the drive interface 118, when the electric drive 114 is used to move the gate 38, the self-lock clutch 116 may be disengaged or unlocked as the torque is transmitted to the input shaft 174. The self-lock clutch 116 may have a normally locked position (e.g., self-locking), such that the self-lock clutch 116 will automatically move to a locked position when a driving force or energy is not applied to the input shaft 174. As a result, if any torque is applied to the output shaft 176, such as resulting from fluid pressure at the gate 38 causing some torque transfer at the screw assembly 110, the torque at the output shaft 176 cannot unlock the self-lock clutch 116 and thus the actuator 60 of the maintains its position and the valve position of the gate 38.

Figure 7:
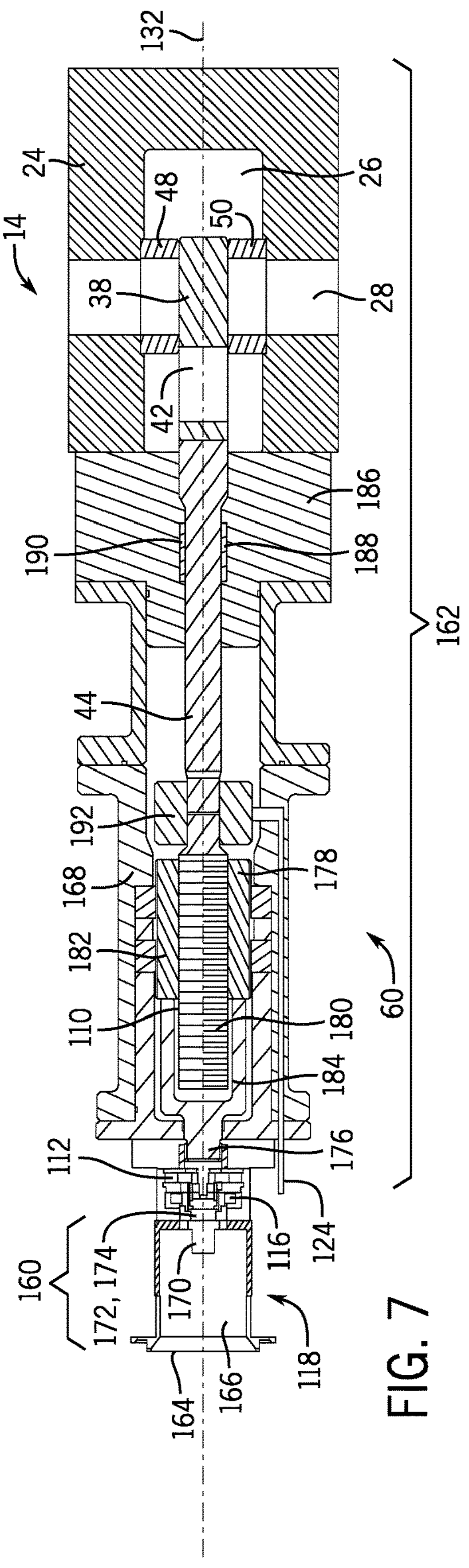
FIG. 7 is a cross-sectional side view of an embodiment of the fluid flow control system of FIGS. 1 and 3, further illustrating details of the actuation system as shown in FIG. 3.

FIG. 7 is a cross-sectional side view of an embodiment of the fluid flow control system 10 as illustrated in FIGS. 1 and 3, further illustrating the actuation system 12 with actuator components 62 substantially the same as illustrated in FIG. 6 with several modifications in accordance with configuration B of FIG. 3. Otherwise, the components with like element numbers are the same as described in detail above. In contrast to the embodiment of FIGS. 2 and 6, the actuator 60 of FIG. 7 may not include the electric drive 114 between the drive interface 118 and the gear assembly 112 and/or the self-lock clutch 116. Instead, the drive interface 118 may connect directly to the input shaft 174 of the self-lock clutch 116. The output shaft 176 of the self-lock clutch 116 may drive the gear assembly 112 to generate a mechanical advantage for the torque to drive the screw assembly 110. Without the electric drive 114, the actuator 60 may rely entirely on the external tool 21 (e.g., ROV 22, retrievable drive module 115, etc.) to operate the actuator 60 via the drive interface 118. The tool drive interface 170 of configuration B is configured to transmit the torque to the shaft 172. However, unlike configuration A, the shaft 172 of configuration B does not interface with the rotor 194 of the electric drive 114. Instead, the shaft 172 may couple to the input shaft 174 of the self-lock clutch 116. Alternatively, the shaft 172 may extend through the internal bore of the self-lock clutch 116, such that the shaft 172 is the input shaft 174.

In further contrast to the embodiment of FIG. 6, the gear assembly 112 of configuration B is coupled to the output shaft 176 of the self-lock clutch 116, such that the gear assembly 112 is part of the driven section 162 of the actuator 60. However, other embodiments of configuration B may reverse the order of the gear assembly 112 and the self-lock clutch 116. Otherwise, the components illustrated in FIG. 7 are substantially the same as discussed above and with reference to FIG. 6. Accordingly, each of the components and their functionality is the same as discussed above.

Figure 8:
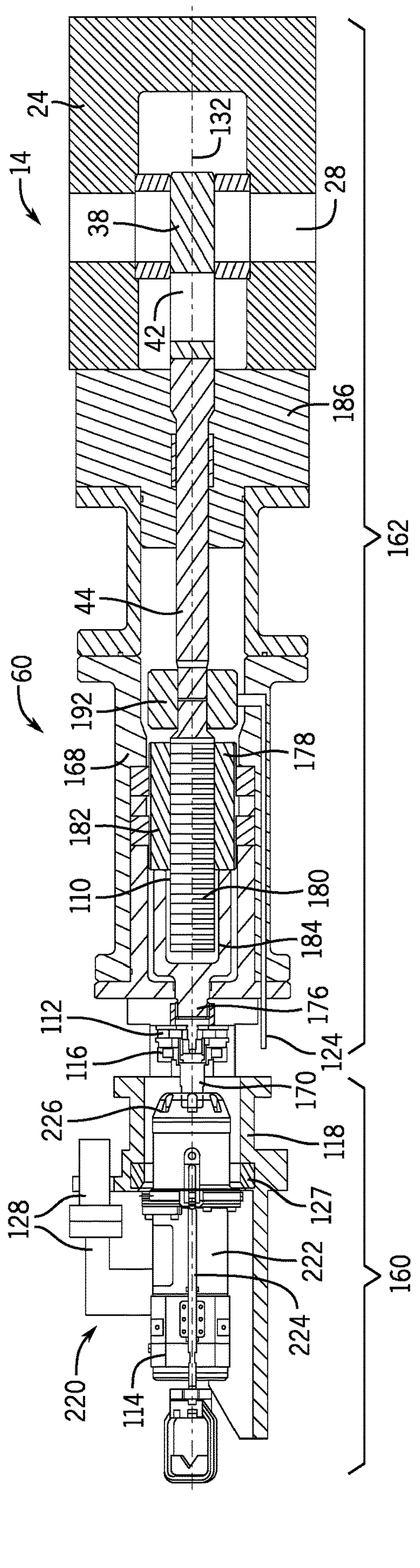
FIG. 8 is a cross-sectional side view of an embodiment of the fluid flow control system of FIGS. 1 and 4, further illustrating details of the actuation system as shown in FIG. 4.

FIG. 8 is a cross-sectional side view of an embodiment of the fluid flow control system 10 as illustrated in FIGS. 1 and 4, further illustrating the actuation system 12 with actuator components 62 substantially the same as illustrated in FIG. 7 with several modifications in accordance with configuration C of FIG. 4. Unless stated otherwise, the components illustrated in FIG. 8 are substantially the same as discussed above with reference to FIGS. 6 and 7, and thus each of the components and their functionality is the same as discussed above. Similar to configuration B of FIGS. 3 and 7, the actuator 60 of FIG. 8 may not include the electric drive 114 between the drive interface 118 and the self-lock clutch 116 and/or the gear assembly 112, but rather configuration C includes the drive interface 118 directly connected to the input shaft 174 of the self-lock clutch 116. In contrast to configuration B of FIGS. 3 and 7, configuration C includes a retrievable drive module 115, 220 (e.g., including the electric drive 114 and a gear assembly) configured to removably couple with the drive interface 118 and operate the actuator 60. In the illustrated embodiment, the retrievable drive module 220 includes an electric motor 222, a motor shaft 224, a tool head 226, a motor controller, a mechanical coupling 127, and an electrical coupling 128. The retrievable drive module 220 may be removably attached to the drive interface 118 via the mechanical couplings 127, which may mate to one another to secure the attachment of the retrievable drive module 220 at the drive interface 118. The electrical coupling 128 of the retrievable drive module 220 may mate to the electrical coupling 128 of the drive interface 118 to establish an electrical connection. The mating electrical couplings 128 may include male and female electrical plugs or stab connectors, twist lock electrical connectors, quick connect/disconnect electrical connectors, or any combination thereof. The electrical couplings 128 may include power connections, data/communication connections, or any combination thereof. The electrical connection may facilitate transmission of electrical power from a power source, such as the energy storage 120 or the power supply 122. In some embodiments, the electrical connection may communicatively couple the controller 18 to the electric drive 114, enabling the controller to control and monitor the electric drive 114.

The electric motor 222 may generate the torque to drive the motor shaft 224, which in turn drives the tool head 226. The tool head 226 may be a torque transfer interface, such as a socket configured to fit a hex head, a square head, a flat head, or another suitable tool interface. In this way, the tool head 226 may interface with the tool drive interface 170 and apply the torque through the drive interface 118 to the self-lock clutch 116 via the shaft 172, as discussed with reference to FIGS. 6 and 7. In some embodiments, the actuator 60 may include the gear assembly 112 in the retrievable drive module 220, on either side of the self-lock clutch 116 in the driven section 162, or a combination thereof. That is, the electric drive 114 may incorporate a gear assembly internally to increase a torque output of the motor shaft 224 or another shaft. In certain embodiments, the gear assembly 112 is removed from the driven section 162 and installed in the retrievable drive module 220, thereby reducing the size and mass of the actuator 60, especially when the retrievable drive module 220 is not attached to the drive interface 118.

In the illustrated embodiment, the retrievable motor module 220 is removably attached to the drive interface 118, such that the drive section 160 may have more than one mode of operation, including an independent mode with the retrievable drive module 220 and an intervention mode without the retrievable drive module 220, wherein the intervention mode may enable operation of the actuator 60 via the external tool 21 (e.g., ROV 22, manual tool, etc.). For example, when the retrievable drive module 220 is attached to the drive interface 118, configuration C is similar to configuration A in that the electric drive 114 may operate the actuator 60. When the retrievable motor module 220 is removed from the drive interface 118, configuration C is similar to configuration B in that the actuator 60 may rely on intervention by the external tool 21 (e.g., ROV 22, manual tool, etc.) to interface with the drive interface 118 to operate the actuator 60. Due to the modularity of configuration C, the electric drive 114 may be removed and replaced with a different electric drive 114 or a different type of drive such as a fluid drive, such as by changing between different retrievable drive modules 220.

Figure 9:
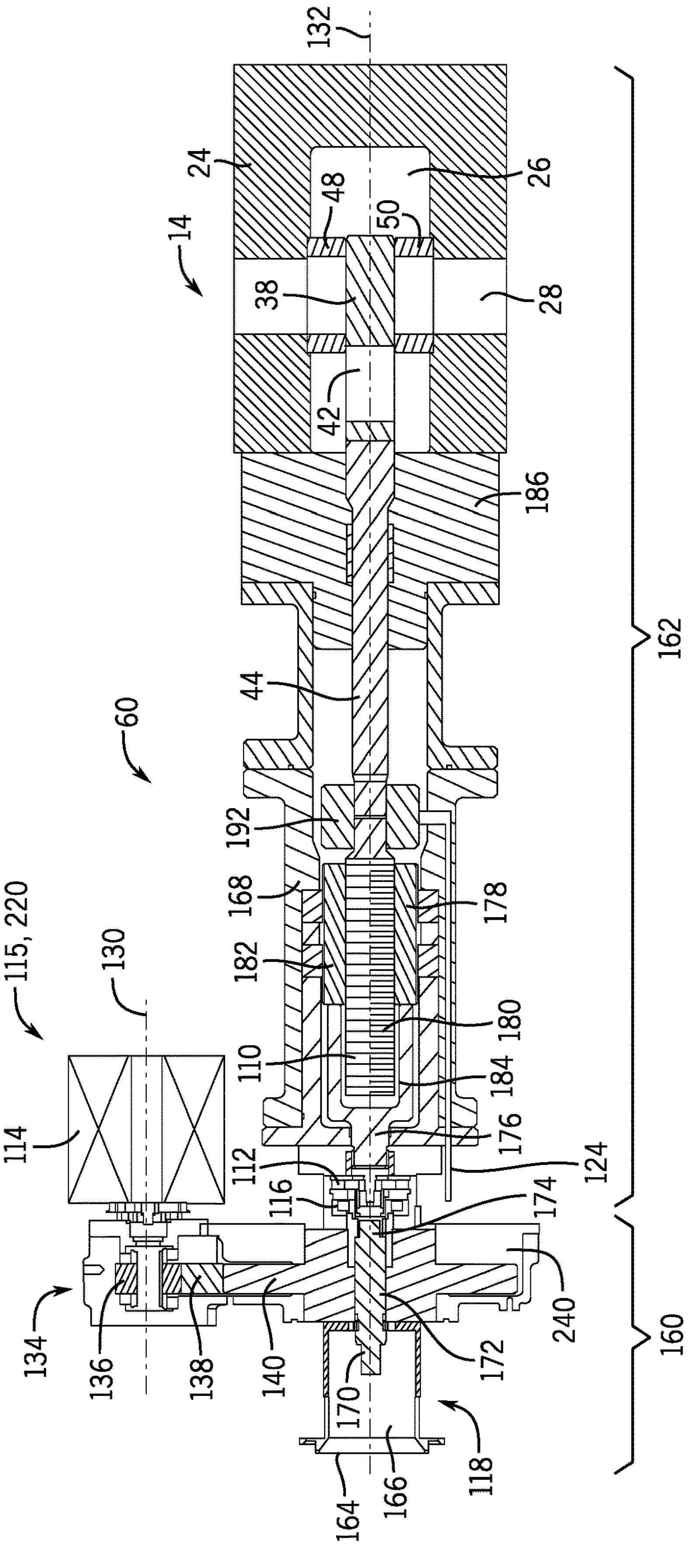
FIG. 9 is a cross-sectional side view of an embodiment of the fluid flow control system of FIGS. 1 and 5, further illustrating details of the actuation system as shown in FIG. 5, wherein an axis of the electric drive is laterally offset an axis of the valve assembly and the electric drive extends toward the valve assembly.

FIG. 9 is a cross-sectional side view of an embodiment of the fluid flow control system 10 as illustrated in FIGS. 1 and 5, further illustrating the actuation system 12 with actuator components 62 substantially the same as illustrated in FIGS. 6-8 with several modifications in accordance with configuration D of FIG. 5. Unless stated otherwise, the components illustrated in FIG. 9 are substantially the same as discussed above with reference to FIGS. 6-8, and thus each of the components and their functionality is the same as discussed above. In configuration D of FIG. 5, the valve assembly 14, the screw assembly 110, the gear assembly 112, the self-lock clutch 116, and the drive interface 118 are configured in a series arrangement along the central axis 132. In contrast to the configuration A of FIGS. 2 and 6 and the configuration C of FIGS. 4 and 8, the electric drive 114 is aligned with an offset axis 130 laterally shifted from the central axis 132. For example, the axes 130 and 132 may be parallel but laterally offset from one another.

In this configuration D, the electric drive 114 transmits the torque to the rest of the actuator 60 via the gear assembly 134, which may include the gear 136, the idler gear 138, and the gear 140. The electric drive 114 is configured to drive the gear 136, which is likewise aligned along the offset axis 130. The gear 136 may drive the idler gear 138, which may in turn drive the gear 140. The gear 140 is connected to the series configuration along the input shaft 174 of the self-lock clutch 116. That is, the electric drive 114 may transmit the torque to the input shaft 174 via the gear assembly 134. The input shaft 174 of the self-clutch lock 116, the shaft 172 driven by the drive interface 118, and the shaft of the gear 140 may be coupled to one another to rigidly transmit the torque through each of the shafts. Alternatively, each of the shafts may be a same single shaft. The gear assembly 134 may be disposed within a gear assembly housing 240 coupled to the drive interface 118 and/or the actuator housing 168. The electric drive 114 may be secured to the gear assembly housing 240 via mechanical couplings 127. In some embodiments, the gear assembly 134 and/or the gear assembly 112 may provide a mechanical advantage for the torque. Accordingly, in some embodiments, the gear assembly 112 may be omitted from the actuator 60. The gear assembly 134 may include any number, combination, and arrangement of spur gears, bevel gears, planetary gear assembly (e.g., sun gear, planet gears, and ring gear), belts, and the like.

As illustrated, configuration D enables transmission of torque to the input shaft 174 from two parallel sources of torque. During normal operation, the electric drive 114 may generate the torque and transmit the torque to the input shaft 174 via the gear assembly 134. When the electric drive 114 is inoperable, such as in the case of a power failure, the drive interface 118 may receive the torque from the external tool 21 (e.g., ROV 22, manual tool, etc.) and transmit the torque to the input shaft 174. In this way, configuration D enables either the external tool 21 (e.g., via drive interface 118) or the electric drive 114 to provide the torque to operate the actuator 60, depending on various operating parameters and constraints. In contrast to configuration C, configuration D may switch between the independent mode using the electric drive 114 and the intervention mode using the external tool 21 (e.g., ROV 22, manual tool, etc.) without modification to the actuator 60, such as removing the retrievable drive module 220.

In configuration D, the electric drive 114 is oriented such that the body of the electric drive 114 extends forward, i.e., in the direction of the valve assembly 14 along the offset axis 130. Accordingly, the length of the actuator 60 may be reduced as the electric drive 114 does not extend the length of the actuator 60 as it would otherwise (e.g., in configuration A). When the electric drive 114 extends forward, as shown in FIG. 9, the actuator 60 may be more compact than alternative configurations, such as configuration E as described below. Additionally, the electric drive 114 may be better protected the less it protrudes toward the back of the actuator 60. In the illustrated embodiment, the electric drive 114 is also side-by-side with the driven section 162 (e.g., self-lock clutch 116, gear assembly 112, screw assembly 110, and valve assembly 14), such that the driven section 162 provides some additional protection for the electric drive 114.

Figure 10:
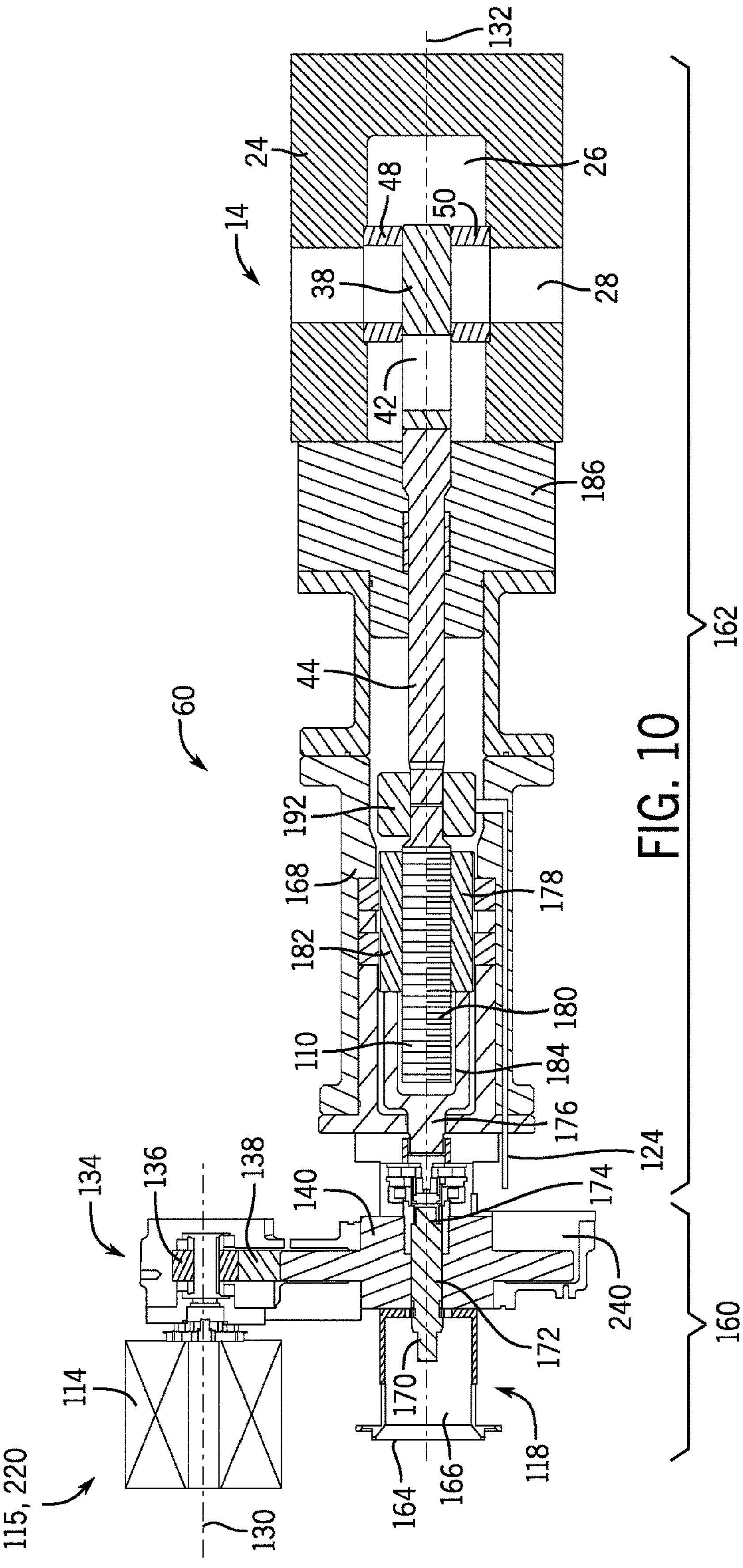
FIG. 10 is a cross-sectional side view of an embodiment of the fluid flow control system of FIGS. 1 and 5, further illustrating details of the actuation system as shown in FIG. 5, wherein an axis of the electric drive is laterally offset an axis of the valve assembly and the electric drive extends away from the valve assembly.

FIG. 10 is a cross-sectional side view of an embodiment of the fluid flow control system 10 as illustrated in FIGS. 1 and 5, further illustrating the actuation system 12 with actuator components 62 substantially the same as illustrated in FIGS. 6-8 with several modifications in accordance with configuration E of FIG. 5. In particular, the embodiment of FIG. 10 (configuration E) is substantially the same as the embodiment of FIG. 9 (configuration D), wherein the orientation of the electric drive 114 is reversed in an opposite direction along the offset axis 130. Unless stated otherwise, the components illustrated in FIG. 10 are substantially the same as discussed above with reference to FIGS. 6-9, and thus each of the components and their functionality is the same as discussed above. As illustrated in FIG. 10 (configuration E), the electric drive 114 extends from the gear assembly 134 backward, away from the valve assembly 14, such that the electric drive 114 is side-by-side with the drive interface 118. As such, the electric drive 114 may be more easily accessible for maintenance, replacement, or external manipulation. In some embodiments, the electric drive 114 of configurations D and E may be a retrievable drive module 115, 220 removably attached to the gear assembly 134. In comparison to the embodiment of FIG. 9 (configuration D), the embodiment of FIG. 10 (configuration E) may enable easier access to the retrievable drive module 115, 220 (e.g., electric by the external tool 21 (e.g., ROV 22, manual tool, etc.).

Figure 11:
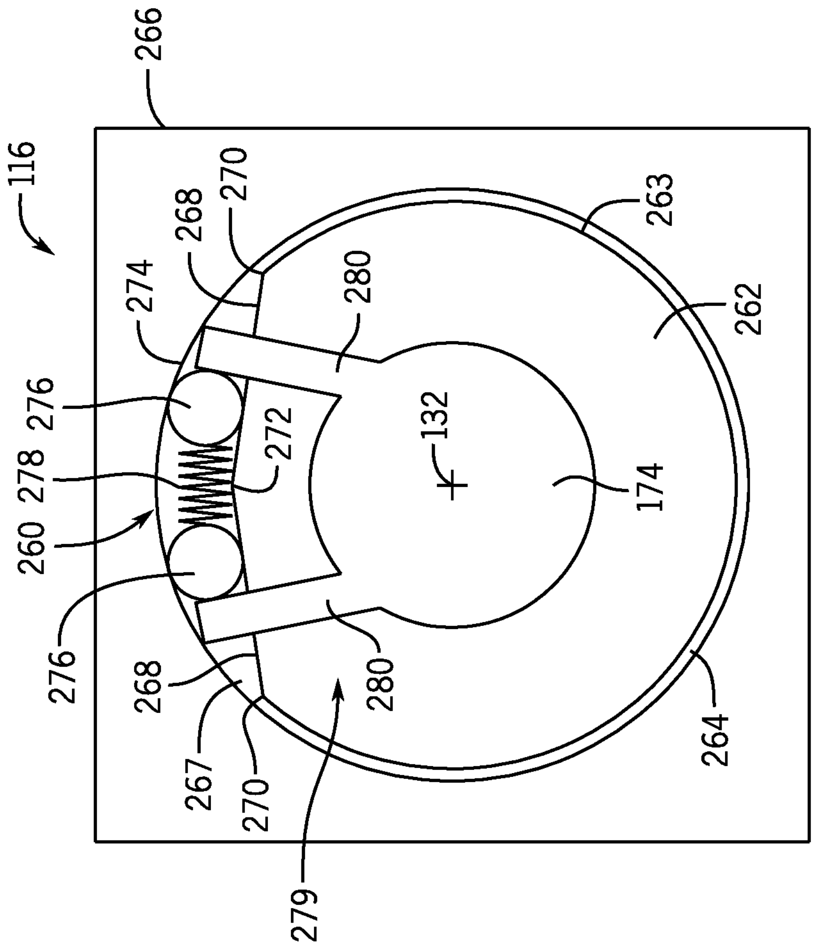
FIG. 11 is a cross-sectional side view of an embodiment of the self-lock clutch having a spring-biased roller assembly.

FIG. 11 is a cross-sectional side view of an embodiment of the self-lock clutch 116 having a spring-biased roller assembly 260. The self-lock clutch 116 may include a cam portion 262 disposed within a circular cavity 264 of a clutch housing 266. The cam portion 262 is partially cylindrical and configured to rotate within the circular cavity 264 about the central axis 132 like a shaft in a bore. However, the cam portion 262 is not entirely cylindrical. That is, the cam portion 262 is circular around its circumference along a semi-circular surface 263. However, the semi-circular surface 263 is interrupted by a cam surface 267 having oppositely angled surfaces 268, which extend from respective outside edges 270 on the semi-circular surface 263 and converge at an inside peak or edge 272 within the circular cavity 264. The angled surfaces 268 may include flat angled surfaces, curved angled surfaces, or a combination thereof. The angled surfaces 268 may be symmetric relative to the peak or edge 272. The angled surfaces 268 and the peak or edge 272 may define a triangular portion or an arcuate portion (e.g., concave or convex dome) that interrupts the semi-circular surface 263. The angled surfaces 268 also may be described as cutaway or recessed portions relative to the semi-circular surface 263. Along each of the angled surfaces 268, the radial distances from the central axis 132 gradually decrease from the outside edges 270 toward the inside edge 272. Accordingly, the normal distance from a point on the angled surfaces 268 to an inner annular surface 274 of the clutch housing decreases as the point approaches either the inside edge 272 or the outside edges 270.

The spring-biased roller assembly 260 is a resilient coupling that connects the input shaft 174 to the output shaft 176. The spring-biased roller assembly 260 includes two rollers 276 (e.g., cylindrical rollers) disposed in the space between the angled surfaces 268 and the inner annular surface 274. The rollers 276 are elastically coupled by a spring 278, such as a coil spring, an elastic spring material, a bladder, a piston-cylinder assembly, or another biasing element. The spring 278 is normally extended, pushing or biasing the rollers 276 away from the inside edge 272 and jamming the rollers 276 against the inner annular surface 274 at the outside edges 270. The jamming of the rollers 276 blocks rotation of the cam portion 262. The output shaft 176 may be coupled to the cam portion 262. In operation, a torque applied to the output shaft 176 may not cause the cam portion 262 to rotate, because the applied torque is balanced by a reaction torque produced by the jamming of the rollers 276.

The input shaft 174 may be aligned axially along the central axis 132. An arm assembly 279 may be coupled to the input shaft 174. The arm assembly 279 may include first and second arms 280 extending radially away from the input shaft and axially into the page of FIG. 11. In this way, the first and second arms 280 may be disposed about the rollers 276 (e.g., circumferentially opposite sides of the rollers 276). As the input shaft 174 rotates, the arm assembly 279 (e.g., arms 280) may push one or both of the rollers 276 toward the inside edge 272 and away from the inner annular surface 274 at the outside edges 270. Consequently, the rollers 276 become unjammed from the inner annular surface 274, enabling the cam portion 262 to rotate freely. As the input shaft 174 continues to turn, the force of the arm assembly 279 on the rollers 276 transmits torque from the input shaft 174 to the cam portion 262 to the output shaft 176. Hence, the self-lock clutch 116 is unlocked when torque is provided to the input shaft 174. When the input shaft 174 stops turning, the force is no longer applied to the rollers 276, so the spring 278 jams the rollers 276 back against the inner annular surface 274 at the outside edges 270, locking the position of the cam portion 262 and the output shaft 176. Hence, the self-lock clutch 116 is locked when no torque is provided to the input shaft 174.

Figure 12:
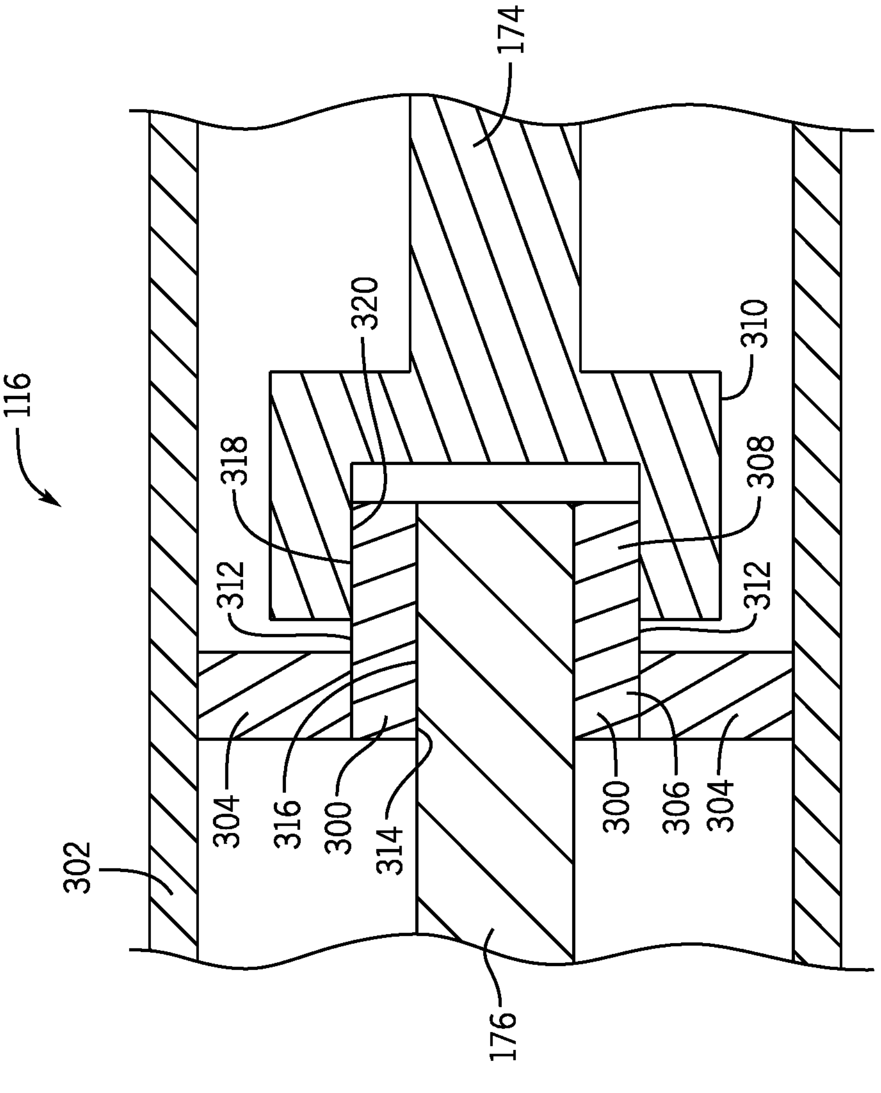
FIG. 12 is a cross-sectional side view of an embodiment of the self-lock clutch having a radially expanding annular sleeve.

FIG. 12 is a cross-sectional side view of another embodiment of the self-lock clutch 116 having a resilient or retractable coupling 300 disposed inside of a stationary housing 302 having a clutch housing 304, wherein the retractable coupling 300 is configured to radially expand and contract between the output shaft 176 and the clutch housing 304. As illustrated, first and second portions 306 and 308 of the retractable coupling 300 extend circumferentially about the output shaft 176 at different axial portions of the output shaft 176, the clutch housing 304 extends circumferentially about the first portion 306 of the retractable coupling 300, and the input shaft 174 has a cup-shaped portion 310 extending circumferentially about the second portion 308 of the retractable coupling 300. In certain embodiments, the retractable coupling 300 includes a segmented annular sleeve, a segmented ring, and/or a plurality of coupling segments 312 circumferentially spaced about the output shaft 176. For example, the plurality of coupling segments 312 may include 2, 3, 4, 5, 6, 7, 8, 9, 10, or more coupling segments. The segments may be rigid or resilient segments, such as resilient metallic segments. However, in some embodiments, the retractable coupling 300 may include a split ring having two arcuate segments, a C-ring having a single gap, or another suitable coupling that enables radial expansion and contraction. Collectively, the segments 312 may be configured to apply an outward radial force against the clutch housing 304 to lock the retractable coupling 300 against the clutch housing 304 when a torque is not applied via the input shaft 174.

The retractable coupling 300 is configured to engage with the input shaft 174 and the output shaft 176 with interfaces that enable the output shaft 176 (but not the input shaft 174) to selectively retract the retractable coupling 300 (e.g., contract or move radially inward toward the output shaft 176 and away from the clutch housing 304) to unlock the retractable coupling 300 from the clutch housing 304. Otherwise, the retractable coupling 300 is normally expanded radially outward into engagement with the clutch housing 304 to lock the input and output shafts 174 and 176. The retractable coupling 300 includes a non-circular interior surface 314 engaged with a non-circular exterior 316 (or non-circular cross-section) of the output shaft 176. The non-circular interior surface 314 and the non-circular exterior surface 316 may define a square interface, triangular interface, a polygonal interface, a hexagonal interface, a wavy interface having multiple protrusions and recesses, or any combination thereof. The retractable coupling 300 includes a non-circular exterior surface 318 engaged with a non-circular interior surface 320 of the cup-shaped portion 310 of the input shaft 174. The non-circular exterior surface 318 and the non-circular interior surface 320 may include a plurality of variable radius curved surfaces, which define a plurality of cam surfaces between the cup-shaped portion 310 and the retractable coupling 300. Accordingly, in operation, the rotation or torque applied through the input shaft 174 engages the cam surfaces (e.g., surfaces 318 and 320), thereby forcing the retractable coupling 300 (e.g., segments 312) to contract or more radially inward toward the output shaft 176 and away from the clutch housing 304, thereby creating a gap or clearance (e.g., radial clearance) between the retractable coupling 300 and the clutch housing 304 to enable the input shaft 174 to transmit torque to the output shaft 176. However, when rotation or torque is not applied through the input shaft 174, the retractable coupling 300 (e.g., segments 312) expands or moves radially outward into engagement with the clutch housing 304, thereby eliminating the gap or clearance and creating a frictional engagement to block rotation of the input and output shafts 174 and 176.

From another perspective, the retractable coupling 300 may automatically expand radially outward, causing the retractable coupling 300 to jam into the clutch housing 304 unless torque is applied that causes the retractable coupling 300 to contract. That is, while the first portion 306 of the retractable coupling 300 is pressed tightly against the clutch housing 304, static friction inhibits rotation of the retractable coupling 300 and the output shaft 176. Any torque applied to the output shaft 176 cannot free the retractable coupling 300 from the clutch housing 304. For example, as the input shaft 174 begins to rotate, it may torsionally deform and squeeze the retractable coupling 300 due to the non-circular cross sections or surfaces 314 and 316 of the output shaft 176 and/or the retractable coupling 300. In other words, the input shaft 174 may twist and radially compress the retractable coupling 300, thereby contracting the retractable coupling 300 inwardly away from the clutch housing 304 along the first portion 306 (e.g., creating an annular gap and/or radial clearance). As a result, a radial expansion of the retractable coupling 300 against the clutch housing 304 is inhibited or overcome via rotation of the input shaft 174, thereby creating the annular gap and/or the radial clearance to permit free rotation and torque transfer from the input shaft 174 to the output shaft 176. Therefore, the friction may be reduced or eliminated between the retractable coupling 300 and the clutch housing 304, enabling the retractable coupling 300 and the output shaft 176 to rotate as the input shaft 174 rotates. Hence, the self-lock clutch 116 is unlocked when torque is provided to the input shaft 174. When the input shaft 174 stops turning, the retractable coupling 300 may expand and jam into the clutch housing 304, locking the output shaft 176. Hence, the self-lock clutch 116 is locked when a sufficient torque is not provided to the input shaft 174.

Technical effects of the disclosed embodiments include an actuation system 12 that may eliminate drawbacks of a spring biased actuation system, such as by reducing an amount of force to move a valve assembly 14 between open and closed positions. The actuation system 12 may include an actuator 60 having an electric drive 114 powered by an energy storage unit 120, such as one or more batteries. The energy storage unit 120 ensures that power is available to operate the electric drive 114 during normal operation and emergency situations. The actuation system 12 also includes an drive interface 118 to enable an ROV 22 to override operation of the actuator 60, for example, if the electric drive 114 is not functioning properly. The actuation system 12 further includes a self-lock clutch 116 configured to block motion of the actuator 60 when a driving force is not applied to operate the actuator 60, thereby securing or locking a current position of the actuator 60 and the valve assembly 14. In certain embodiments, the self-lock clutch 116 does not rely on any external power sources, such as electrical power, fluid power, or the like. Instead, the self-lock clutch is a mechanically operated clutch that enables torque transfer only when torque is applied to the input shaft 174, while not enabling torque transfer in response to torque applied to the output shaft 176.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

an actuator, comprising:

an actuation stem;

a screw assembly coupled to the actuation stem, wherein the screw assembly comprises a rotating screw portion coupled to a translating screw portion;

a self-lock clutch coupled to the screw assembly, wherein the self-lock clutch comprises a locked position that blocks rotation of the rotating screw portion and an unlocked position that enables rotation of the rotating screw portion, wherein the self-lock clutch comprises a resilient coupling disposed between an input shaft and an output shaft, and wherein the resilient coupling comprises:

a spring;

a spring-biased roller assembly having the spring disposed circumferentially between first and second rollers; and an arm assembly coupled to the input shaft, wherein the arm assembly comprises first and second radial arms extending radially outwardly from the input shaft and disposed about the spring-biased roller assembly; and a drive section coupled to the self-lock clutch, wherein the self-lock clutch is configured to move from the locked position to the unlocked position in response to a torque applied by the drive section to the self-lock clutch.

2. The system of claim 1, wherein the resilient coupling further comprises a cam portion coupled to the output shaft, wherein the spring-biased roller assembly is disposed between the cam portion and an inner annular surface of a housing of the self-lock clutch.

3. The system of claim 2, wherein the cam portion comprises first and second angled surfaces, wherein the first roller is disposed between the first angled surface and the inner annular surface of the housing, and wherein the second roller is disposed between the second angled surface and the inner annular surface of the housing.

4. The system of claim 3, wherein the first and second angled surfaces comprise oppositely angled surfaces converging at an edge of the cam portion, and wherein the spring is disposed adjacent to the edge.

5. The system of claim 1, further comprising a gear assembly disposed between the screw assembly and the self-lock clutch.

6. The system of claim 1, wherein the drive section comprises an electric drive.

7. The system of claim 6, wherein the drive section further comprises a drive interface configured to enable a drive tool to apply the torque.

8. The system of claim 1, wherein the drive section comprises a drive interface configured to enable a drive tool to apply the torque.

9. The system of claim 8, wherein the drive section further comprises an electric drive disposed between the self-lock clutch and the drive interface.

10. The system of claim 8, wherein the drive section further comprises a retrievable drive module removably coupled to the drive interface, wherein the retrievable drive module comprises an electric drive.

11. The system of claim 10, wherein the retrievable drive module comprises a gear assembly coupled to the electric drive.

12. The system of claim 8, further comprising a gear assembly disposed between the self-lock clutch and the drive interface.

13. The system of claim 12, wherein the drive section further comprises an electric drive coupled to the gear assembly in an offset configuration relative to the self-lock clutch and the drive interface.

14. The system of claim 13, wherein the electric drive and the self-lock clutch are coupled to a first side of the gear assembly, and the drive interface is coupled to a second side of the gear assembly.

15. The system of claim 13, wherein the self-lock clutch is coupled to a first side of the gear assembly, and the electric drive and the drive interface are coupled to a second side of the gear assembly.

16. The system of claim 1, further comprising a valve assembly coupled to the actuator, wherein the actuation stem comprises a valve stem coupled to a valve disposed in a valve body of the valve assembly, wherein the locked position is configured to hold the position of the actuation stem to hold a valve position of the valve.

17. The system of claim 1, wherein the actuation stem, the screw assembly, the self-lock clutch, and the drive section are disposed in series along a central axis.

18. A method, comprising:

blocking rotation of a rotating screw portion of a screw assembly coupled to an actuation stem of an actuator via a locked position of a self-lock clutch, wherein the screw assembly comprises a translating screw portion coupled to the rotating screw portion, wherein the self-lock clutch comprises a resilient coupling disposed between an input shaft and an output shaft, and wherein the resilient coupling comprises:

a spring;

a spring-biased roller assembly having the spring disposed circumferentially between first and second rollers; and an arm assembly coupled to the input shaft, wherein the arm assembly comprises first and second radial arms extending radially outwardly from the input shaft and disposed about the spring-biased roller assembly; and enabling rotation of the rotating screw portion via an unlocked position of the self-lock clutch, wherein enabling rotation comprises moving the self-lock clutch from the locked position to the unlocked position in response to a torque applied by a drive section to the self-lock clutch.

19. A system, comprising:

a valve assembly having a valve disposed in a valve body; and an actuator coupled to the valve assembly, comprising:

an actuation stem;

a screw assembly coupled to the actuation stem, wherein the screw assembly comprises a rotating screw portion coupled to a translating screw portion;

a gear assembly coupled to the screw assembly;

a self-lock clutch coupled to the gear assembly, wherein the self-lock clutch comprises a locked position that blocks rotation of the rotating screw portion and an unlocked position that enables rotation of the rotating screw portion, wherein the self-lock clutch comprises a retractable coupling comprising:

an interior surface configured to engage an exterior of an output shaft; and an exterior surface configured to engage an interior of an input shaft; and a drive section coupled to the self-lock clutch, wherein the retractable coupling of the self-lock clutch is configured to compress radially between the input shaft and the output shaft to move from the locked position to the unlocked position in response to a torque applied by the drive section to the self-lock clutch, wherein the drive section comprises an electric drive, a drive interface, or a combination thereof.

20. The system of claim 19, wherein the exterior surface of the retractable coupling comprises a non-circular exterior surface, and wherein the interior of the input shaft comprises a non-circular interior.

* * * * *